US012808772B2

(12) United States Patent
Sandoghdar et al.

(10) Patent No.: US 12,808,772 B2
(45) Date of Patent: Nov. 24, 2026

(54) METHOD AND APPARATUS FOR DETERMINING NANOPARTICLE PROPERTIES OF NANOPARTICLES IN A SAMPLE

(71) Applicant: Max-Planck-Gesellschaft zur Foerderung der Wissenschaften e. V., Munich (DE)

(72) Inventors: Vahid Sandoghdar, Erlangen (DE); Martin Blessing, Erlangen (DE); Anna D. Kashkanova, Erlangen (DE); Andre Gemeinhardt, Erlangen (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 253 days.

(21) Appl. No.: 18/708,291

(22) PCT Filed: Nov. 9, 2021

(86) PCT No.: PCT/EP2021/081037
§ 371 (c)(1),
(2) Date: May 8, 2024

(87) PCT Pub. No.: WO2023/083433
PCT Pub. Date: May 19, 2023

(65) Prior Publication Data

US 2024/0418627 A1 Dec. 19, 2024

(51) Int. Cl.
*G01N 15/1433* (2024.01)
*G01N 15/00* (2024.01)
(Continued)

(52) U.S. Cl.
CPC ..... *G01N 15/1433* (2024.01); *G01N 15/1434* (2013.01); *G01N 2015/0038* (2013.01);
(Continued)

(58) Field of Classification Search
CPC ........................................................ G01N 15/14
See application file for complete search history.

(56) References Cited

U.S. PATENT DOCUMENTS 8,791,985 B2 7/2014 Grier et al.
2003/0139886 A1* 7/2003 Bodzin .................. G01N 21/49
702/28

(Continued)

FOREIGN PATENT DOCUMENTS

CN 109932304 A 6/2019
JP 2011-502256 A 1/2011

OTHER PUBLICATIONS

English Abstract for CN 109932304 A (2019).

(Continued)

*Primary Examiner* — Rufus L Phillips
(74) *Attorney, Agent, or Firm* — Caesar Rivise, PC

(57) ABSTRACT

A method of determining nanoparticle properties of nanoparticles (2) included in a sample (1), comprising the steps of collecting sequential frames of images by employing an interferometric microscope device (110), wherein the sample (1) is illuminated with illumination light (3) from a coherent light source device (111) and the images are created by scattering light (4) from the nanoparticles (2) superimposed with non-scattered reference light, said scattering light and reference light having a wavelength larger than a cross-sectional dimension of the nanoparticles (2), tracking the nanoparticles (2) in the sequential frames of images, wherein at least one interferometric point spread function (iPSF) feature of each of the nanoparticles (2) is established and nanoparticle trajectory motion data are determined for each nanoparticle (2), comprising the nanoparticle positions in each frame, for each nanoparticle (2), calculating a nanoparticle size d from the trajectory motion data of the
(Continued)

nanoparticle and calculating an interferometric nanoparticle contrast from the at least one iPSF feature of the nanoparticle.

34 Claims, 8 Drawing Sheets

(51) Int. Cl.
*G01N 15/01* (2024.01)
*G01N 15/14* (2024.01)
*G01N 15/1434* (2024.01)

(52) U.S. Cl.
CPC ..... *G01N 2015/0053* (2013.01); *G01N 15/01* (2024.01); *G01N 2015/144* (2013.01); *G01N 2015/1497* (2013.01)

(56) References Cited

U.S. PATENT DOCUMENTS

| | | | | |
|---|---|---|---|---|
| 2004/0051051 | A1* | 3/2004 | Kato | G01N 21/6452<br>250/458.1 |
| 2005/0226129 | A1* | 10/2005 | Carr | G01N 21/49<br>369/125 |
| 2005/0273271 | A1* | 12/2005 | Rao | G01N 15/1433<br>702/19 |
| 2015/0204728 | A1* | 7/2015 | Liu | G01N 15/1434<br>356/497 |
| 2017/0016814 | A1* | 1/2017 | Shirai | G01N 1/00 |
| 2017/0307509 | A1* | 10/2017 | Boccara | G06T 7/0012 |
| 2019/0004299 | A1* | 1/2019 | Kukura | G02B 21/0004 |
| 2019/0310307 | A1* | 10/2019 | Ginsberg | G01R 31/2656 |
| 2020/0096472 | A1* | 3/2020 | Tao | G01N 33/54353 |
| 2020/0378891 | A1 | 12/2020 | Andrecka et al. | |
| 2022/0026331 | A1* | 1/2022 | Simpson | G01N 15/0211 |

OTHER PUBLICATIONS

Kukura et al. (2009). High-speed nanoscopic tracking of the position and orientation of a single virus. Nature Methods, 6(12), 923-929.
Ortega-Arroyo et al. (2012). Interferometric scattering microscopy (iSCAT): new frontiers in ultrafast and ultrasensitive optical microscopy, Physical Chemistry Chemical Physics, 14, 15625-15636.
Office Action issued Sep. 16, 2025 for JP 2024-527092.
Altman et al. (2005). Standard deviations and standard errors. BMJ 331, 903.
Bai et al. (2017). Interference from proteins and surfactants on particle size distributions measured by nanoparticle tracking analysis (NTA). Pharmaceutical Research 34, 800-808.
Bohren et al. (1983). Absorption and Scattering of Light by Small Particles. John Wiley & Sons, Ltd.
Filipe et al. (2010). Critical evaluation of nanoparticle tracking analysis (NTA) by NanoSight for the measurement of nanoparticles and protein aggregates. Pharm. Res. 27(5), 796-810.
Gardiner et al. (2014). Measurement of refractive index by nanoparticle tracking analysis reveals heterogeneity in extracellular vesicles. J. Extracell. Vesicles 3, 1-6.
Gardini et al. (2015). 3D tracking of single nanoparticles and quantum dots in living cells by out-of-focus imaging with diffraction pattern recognition. Scientific Reports, 5:16088.
Hartjes et al. (2019). Extracellular vesicle quantification and characterization: Common methods and emerging approaches. Bioengineering 6, 7.
Kashkanova et al. (2021). Precision single-particle localization using radial variance transform. Opt. Express, 29(7), 11070-11083.
Lee et al. (2007). Characterizing and tracking single colloidal particles with video holographic microscopy. Opt. Express, 15(26), 18275-18282.
Lindfors et al. (2004). Detection and spectroscopy of gold nanoparticles using supercontinuum white light confocal microscopy. Physical Review Letters, 93(3).
Lyklema et al. (1998). Electrokinetics: the properties of the stagnant layer unraveled. Langmuir, 14(20), 5659-5663.
Maguire et al. (2017). Benchmark of nanoparticle tracking analysis on measuring nanoparticle sizing and concentration. J. Micro Nano-Manuf., 5.
Maguire et al. (2018). Characterisation of particles in solution—a perspective on light scattering and comparative technologies. Sci. Technol. Adv. Mat. 19(1), 732-745.
Mahmoodabadi et al. (2020). Point spread function in interferometric scattering microscopy (iSCAT). Part I: aberrations in defocusing and axial localization. Opt. Express 28(18), 25969-25988.
Malloy et al. (2006). NanoParticle tracking analysis—the halo system. Part. Part. Syst. Char. 23, 197-204.
Melo et al. (2021). Size distributions of gold nanoparticles in solution measured by single-particle mass photometry. The Journal of Physical Chemistry B, 125, 12466-12475.
Michalet (2010). Mean square displacement analysis of single-particle trajectories with localization error: Brownian motion in an isotropic medium. Phys. Rev. E 82, 1-13.
Midtvedt et al. (2020). Size and refractive index determination of sub-wavelength particles and air bubbles by holographic nanoparticle tracking analysis. Anal. Chem. 92, 1908-1915.
Midtvedt et al. (2020). Holographic characterisation of subwavelength particles enhanced by deep learning. arXiv:2006.11154.
Midtvedt et al. (2021). Fast and Accurate Nanoparticle Characterization Using Deep-Learning-Enhanced Off-Axis Holography. ACS Nano, 15, 2240-2250.
Pedregosa et al. (2011). Scikit-learn: Machine Learning in Python. J. Mach. Learn. Res. 12, 2825-2830.
Perez-Cabezas et al. (2018). More than just exosomes: distinct Leishmania infantum extracellular products potentiate the establishment of infection. J. Extracell. Vesicles, 7, 1541708.
Piliarik et al. (2014). Direct optical sensing of single unlabelled proteins and super-resolution imaging of their binding sites. Nat. Commun. 5, 1-8.
Taylor et al. (2019). Interferometric scattering microscopy reveals microsecond nanoscopic protein motion on a live cell membrane. Nature Photonics, 13, 480-487.
Taylor et al. (2019). Interferometric scattering microscopy: seeing single nanoparticles and molecules via rayleigh scattering. Nano Lett. 19, 4827-4835.
Taylor et al. (2019). Interferometric scattering (iSCAT) microscopy and related techniques. Chapter 2 of "Label-Free Super-Resolution Microscopy", Springer, pp. 25-65.
Van Der Pol et al. (2014). Refractive index determination of nanoparticles in suspension using nanoparticle tracking analysis. Nano Lett. 14, 6195-6201.
Verpillat et al. (2011). Dark-field digital holographic microscopy for 3D-tracking of gold nanoparticles. Opt. Express, 19(27), 26044-26055.
Young et al. (2018). Quantitative mass imaging of single biological macromolecules. Science, 360.
International Search Report for PCT/EP2021/081037 dated Jul. 29, 2022.
Cheng et al. (2019). High-speed imaging and tracking of very small single nanoparticles by contrast enhanced microscopy. Nanoscale, 11, 568-577.
Bujak et al. (2018). Interferometric scattering (iSCAT) microscopy for high fidelity tracking at microseconds timescales. Proc. of SPIE, vol. 10726.
Manzo et al. (2015). A review of progress in single particle tracking: from methods to biophysical insights. Rep. Prog. Phys. 78, 124601.
Zhu et al. (2016). Accurate retrieval of bimodal particle size distribution in dynamic light scattering. IEEE Photonics Technology Letters, 28(3).

* cited by examiner

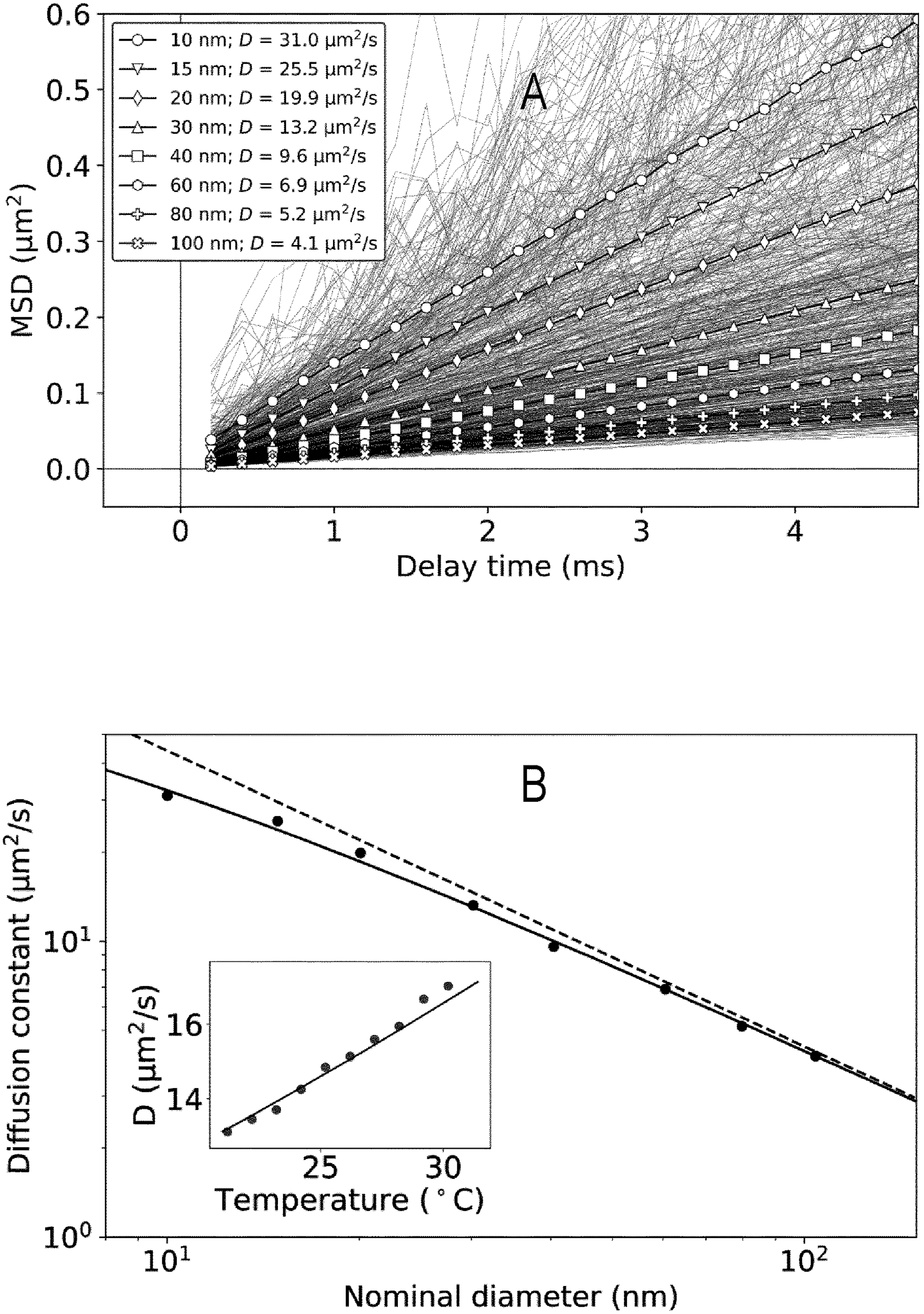
FIG. 3 (A, B)

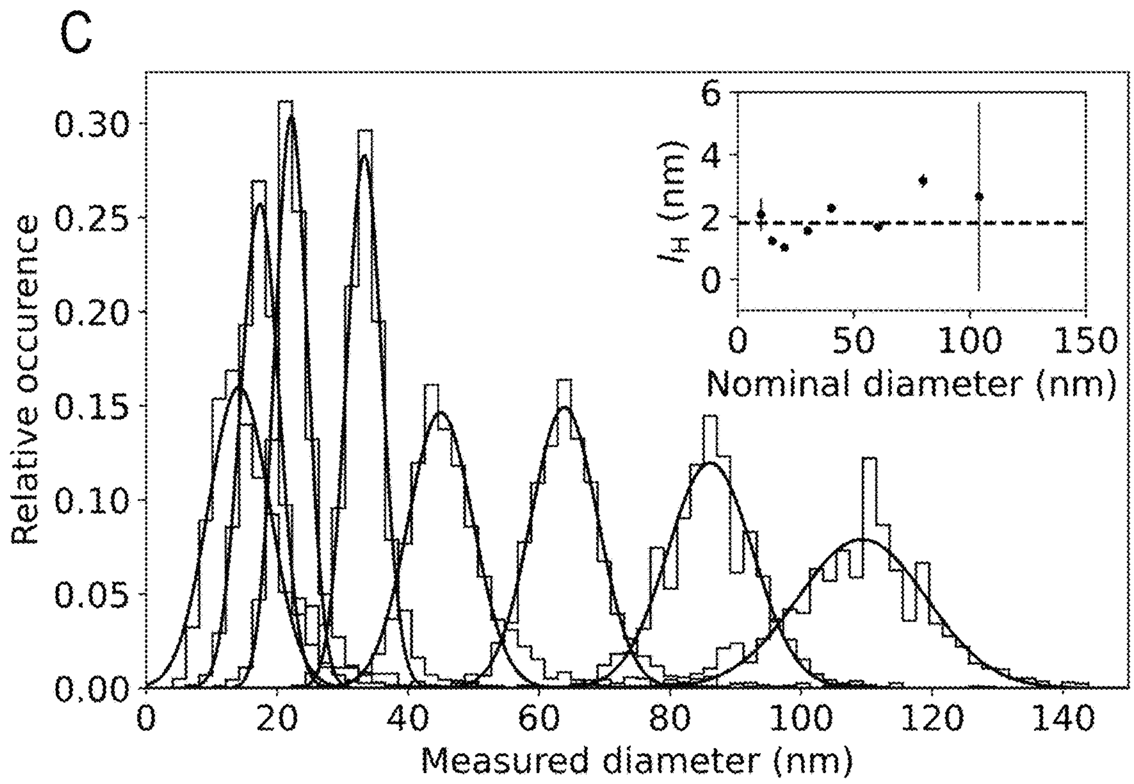
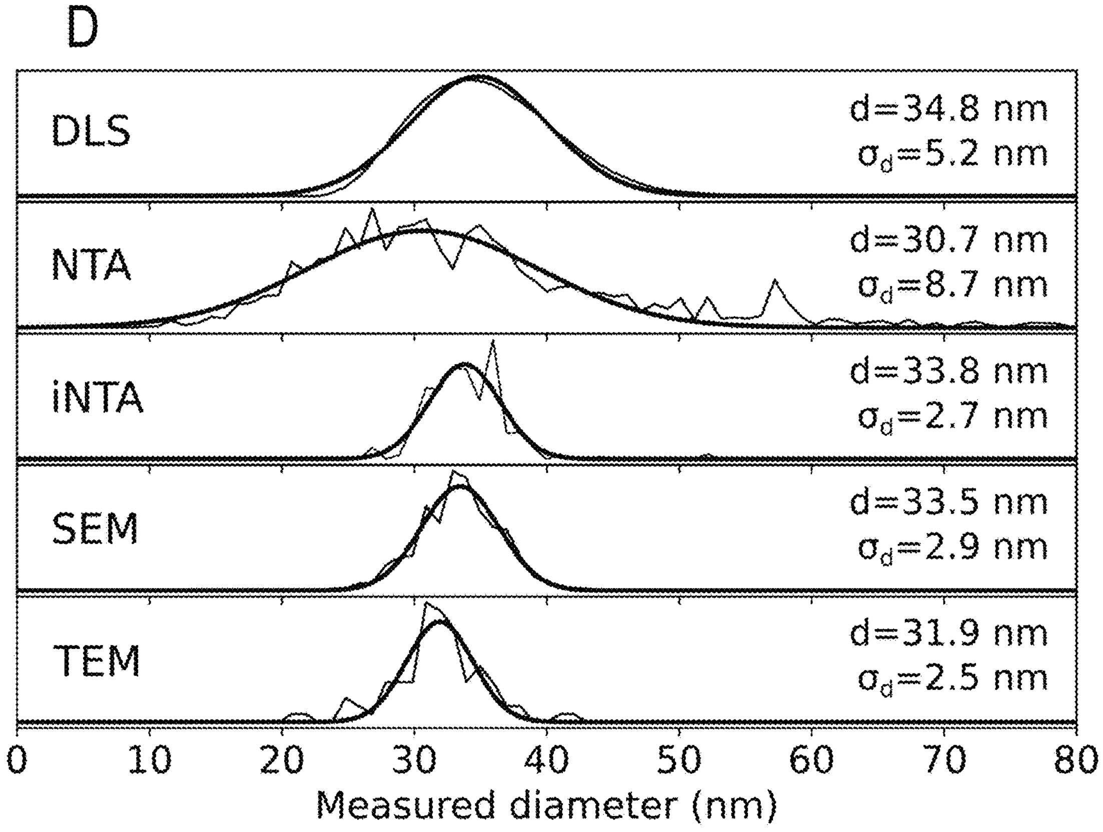
FIG. 3 (C, D)

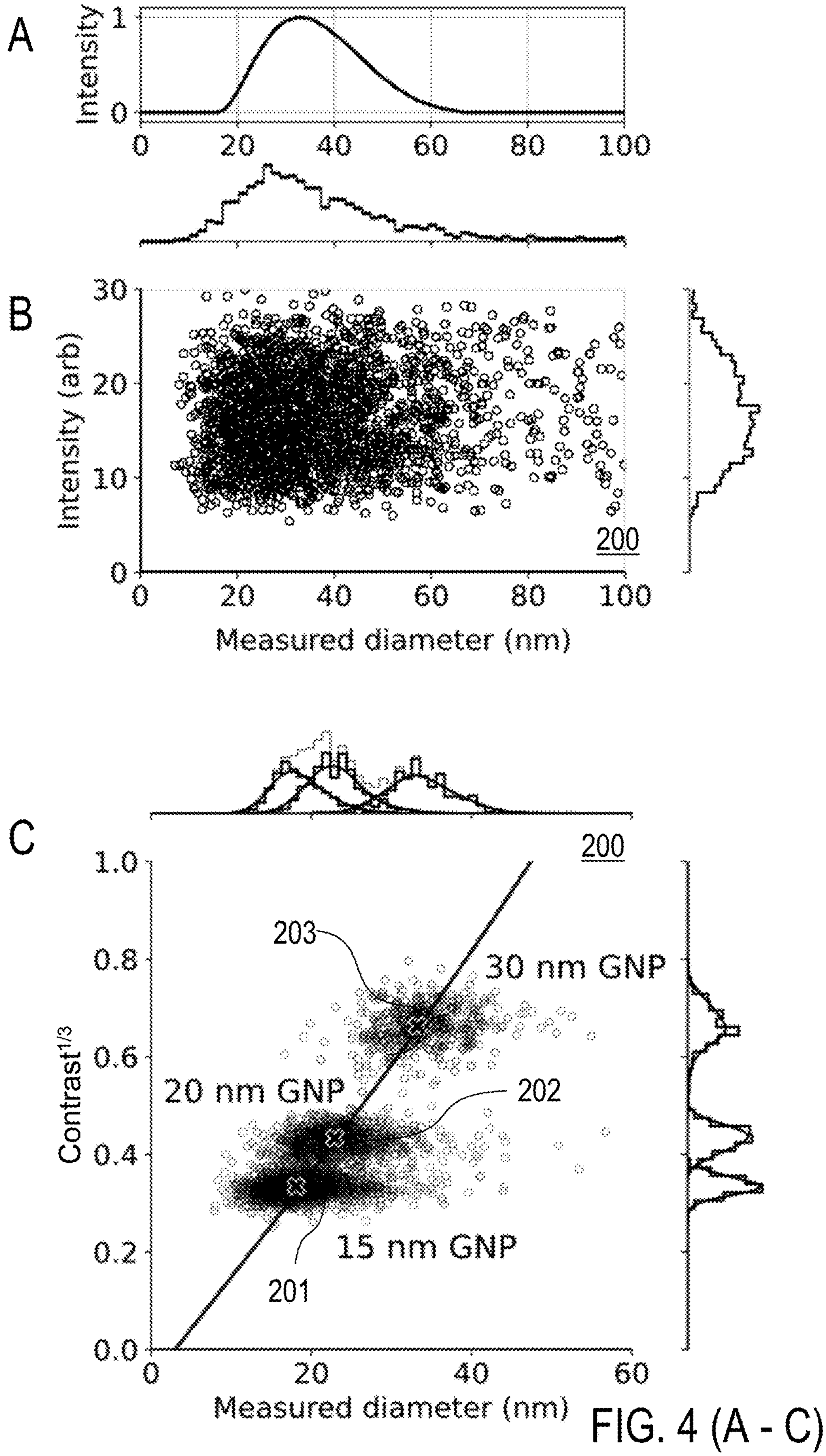
FIG. 4 (A - C)

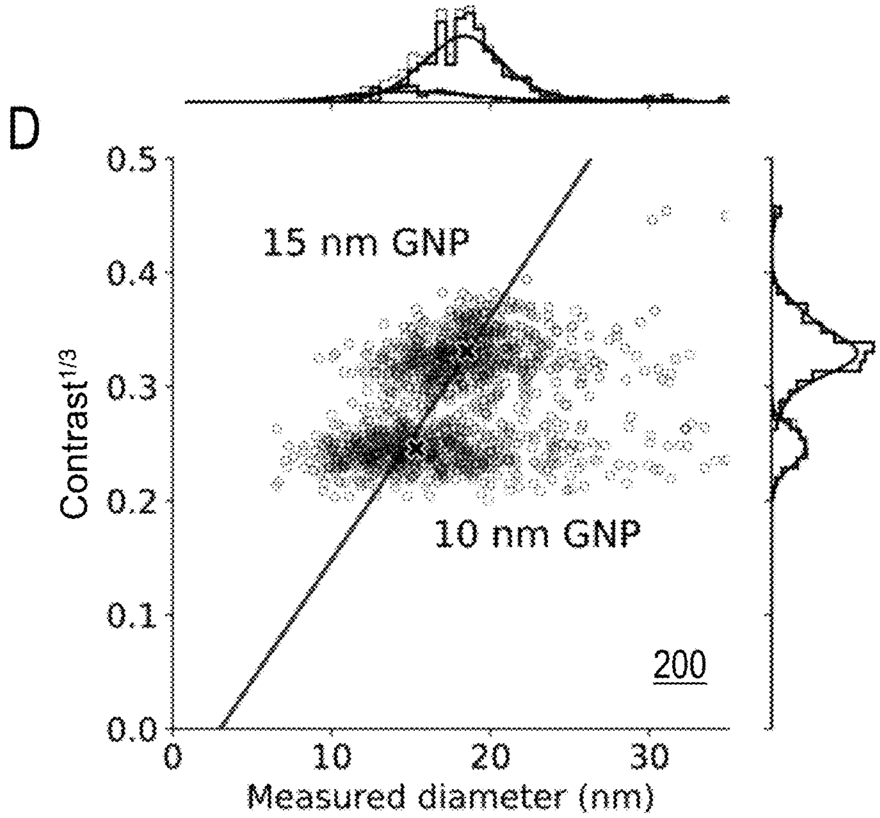
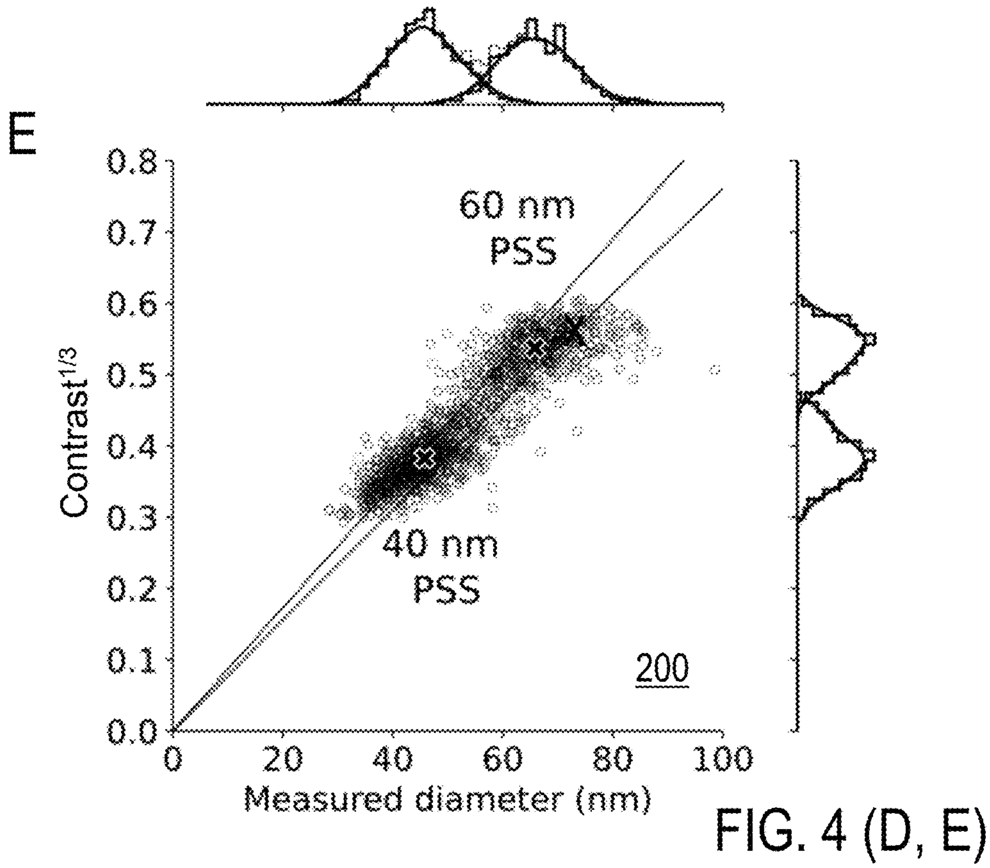
FIG. 4 (D, E)

F
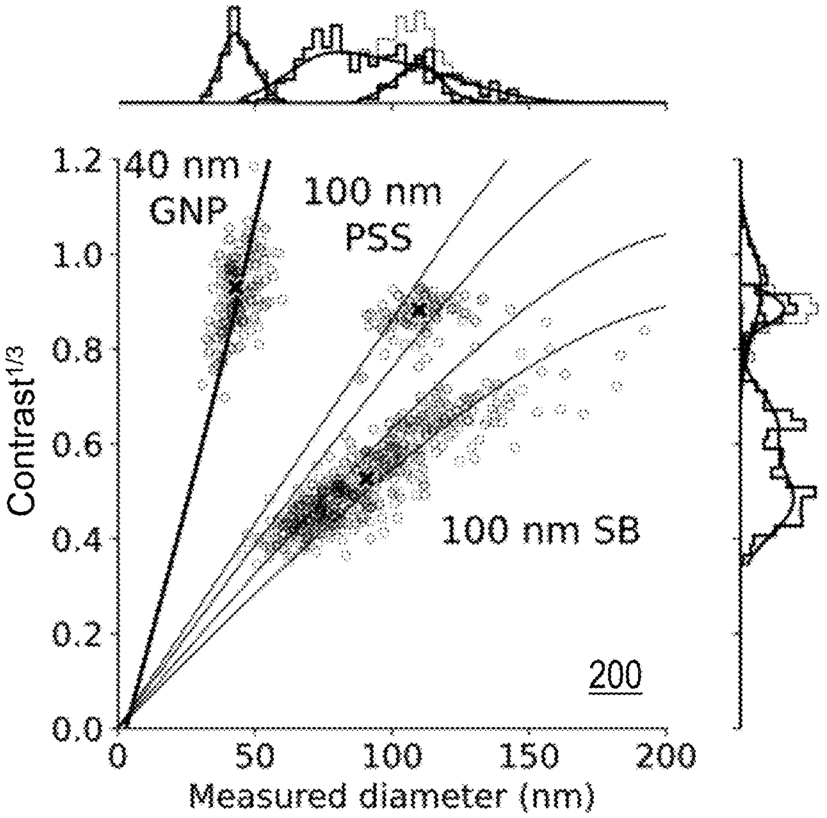
G
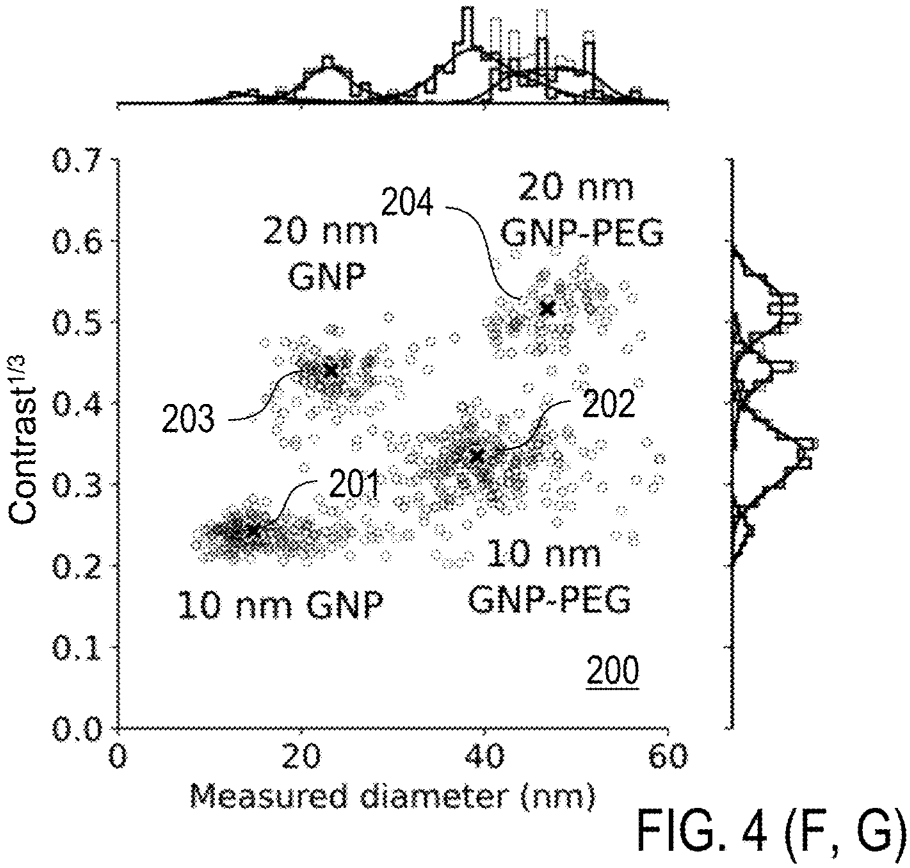
FIG. 4 (F, G)

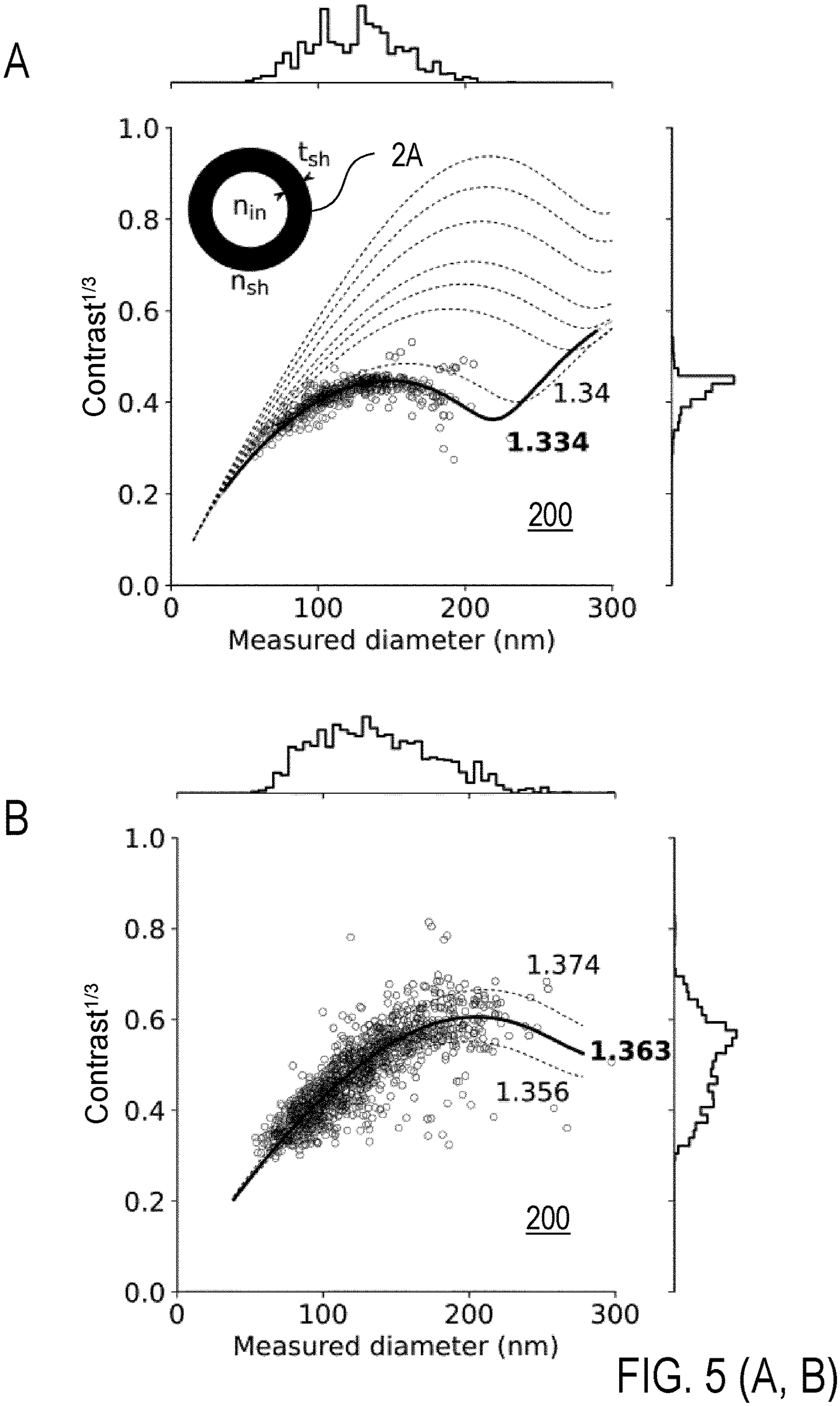
FIG. 5 (A, B)

METHOD AND APPARATUS FOR DETERMINING NANOPARTICLE PROPERTIES OF NANOPARTICLES IN A SAMPLE

CROSS-REFERENCE TO RELATED APPLICATIONS

This application is a U.S. National Phase Application of PCT/EP2021/081037, filed Nov. 9, 2021, the contents of which are incorporated herein by reference in their entireties for all purposes

FIELD OF THE INVENTION

The invention relates to a method and to a test apparatus for determining nanoparticle properties of nanoparticles included in a sample, like e.g. for investigating biological nanoparticles, e.g. macromolecules, in a liquid, like a watery solution. Applications of the invention are available in the fields of physical, chemical and/or biological sample investigations.

BACKGROUND OF THE INVENTION

In the present specification, reference is made to the following prior art illustrating the technical background of the invention, in particular relating to optical detection of nanoparticles in liquid samples:

[1] Zhu, X., Shen, J. & Song, L. Accurate retrieval of bimodal particle size distribution in dynamic light scattering. IEEE Photonic. Tech. L. 28, 311-314 (2016);

[2] Malloy, A. & Carr, B. NanoParticle tracking analysis—the halo™ system. Part. Part. Syst. Char. 23, 197-204 (2006);

[3] Filipe, V., Hawe, A. & Jiskoot, W. Critical evaluation of nanoparticle tracking analysis (NTA) by NanoSight for the measurement of nanoparticles and protein aggregates. Pharm. Res. 27, 796-810 (2010);

[4] Maguire, C. M., Rösslein, M., Wick, P. & Prina-Mello, A. Characterisation of particles in solution a perspective on light scattering and comparative technologies. Sci. Technol. Adv. Mat. 19, 732-745 (2018);

[5] Maguire, C. M. et al. Benchmark of nanoparticle tracking analysis on measuring nanoparticle sizing and concentration. J. Micro Nano-Manuf. 5 (2017);

[6] Lee, S.-H. et al. Characterizing and tracking single colloidal particles with video holographic microscopy. Opt. Express 15, 18275 (2007);

[7] Verpillat, F., Joud, F., Desbiolles, P. & Gross, M. Darkfield digital holographic microscopy for 3D-tracking of gold nanoparticles. Opt. Express 19, 26044 (2011);

[8] Midtvedt, D. et al. Size and Refractive Index Determination of Subwavelength Particles and Air Bubbles by Holographic Nanoparticle Tracking Analysis. Anal. Chem. 92, 1908-1915 (2020);

[9] Midtvedt, B. et al. Fast and Accurate Nanoparticle Characterization Using Deep-LearningEnhanced Off-Axis Holography. ACS Nano (2021);

[10] Lindfors, K., Kalkbrenner, T., Stoller, P. & Sandoghdar, V. Detection and spectroscopy of gold nanoparticles using supercontinuum white light confocal microscopy. Phys. Rev. Lett. 93, 037401-1 (2004);

[11] Taylor, R. W. & Sandoghdar, V. Interferometric Scattering Microscopy: Seeing Single Nanoparticles and Molecules via Rayleigh Scattering. Nano Lett. 19, 4827-4835 (2019);

[12] Piliarik, M. & Sandoghdar, V. Direct optical sensing of single unlabelled proteins and super-resolution imaging of their binding sites. Nat. Commun. 5, 1-8 (2014);

[13] Young, G. et al. Quantitative mass imaging of single biological macromolecules. Science 360 (2018);

[14] Taylor, R. et al. Interferometric scattering microscopy reveals microsecond nanoscopic protein motion on a live cell membrane. Nature Photonics, vol. 13, July 2019, 480-487;

[15] Richard W. Taylor and Vahid Sandoghdar. Interferometric Scattering (ISCAT) Microscopy and Related Techniques. Chapter 2 of "Label-Free Super-Resolution Microscopy", Springer 2019, pp 25-65;

[16] Michalet, X. Mean square displacement analysis of single-particle trajectories with localization error: Brownian motion in an isotropic medium. Phys. Rev. E 82, 1-13 (2010);

[17] Mahmoodabadi, R. G. et al. Point spread function in interferometric scattering microscopy (ISCAT). Part I: aberrations in defocusing and axial localization. Opt. Express 28, 25969-25988 (2020);

[18] Kashkanova, A. D. et al. Precision single-particle localization using radial variance transform. Opt. Express 29, 11070-11083 (2021);

[19] Bohren, C. & Huffman, D. Absorption and Scattering of Light by Small Particles (John Wiley & Sons, Ltd, 1998);

[20] Lyklema, J., Rovillard, S. & Coninck, J. D. Electrokinetics: the properties of the stagnant layer unraveled. Langmuir 442 14, 5659-5663 (1998);

[21] Altman, D. G. & Bland, J. M. Standard deviations and standard errors. BMJ 331, 903 (2005);

[22] Pedregosa, F. et al. Scikit-learn: Machine Learning in Python. J. Mach. Learn. Res. 12, 2825-2830 (2011);

[23] Bai, K., Barnett, G. V., Kar, S. R. & Das, T. K. Interference from proteins and surfactants on particle size distributions measured by nanoparticle tracking analysis (NTA). Pharmaceutical Research 34, 800-808 (2017);

[24] Hartjes, T., Mytnyk, S., Jenster, G., van Steijn, V. & van Royen, M. Extracellular vesicle quantification and characterization: Common methods and emerging approaches. Bioengineering 6, 7 (2019);

[25] Perez-Cabezas, B. et al. More than just exosomes: distinct *Leishmania infantum* extracellular products potentiate the establishment of infection. J. Extracell. Vesicles 8, 1541708-1541708 (2018);

[26] Van Der Pol, E., Coumans, F. A., Sturk, A., Nieuwland, R. & Van Leeuwen, T. G. Refractive index determination of nanoparticles in suspension using nanoparticle tracking analysis. Nano Lett. 14, 6195-6201 (2014); and

[27] Gardiner, C. et al. Measurement of refractive index by nanoparticle tracking analysis reveals heterogeneity in extracellular vesicles. J. Extracell. Vesicles 3, 1-6 (2014).

It is generally known that size and refractive index constitute two key quantities of nanoparticles in a wide range of disciplines such as medicine, pharmaceuticals, food industry, cosmetics, agriculture as well as atmospheric science and environmental studies. Typically, nanoparticles are provided as a monodisperse distribution with one single particle size distribution and/or as a polydisperse distribution with multiple particle size distributions. Various techniques can be employed to determine a particle size distribution, like electron microscopy (EM) or optical methods. EM provides an exquisite resolution in direct imaging, but has substantial limitations in terms of sample preparation, low speed and ex-situ measurement character. Indeed, optical methods dominate the nanoparticle measurement techniques despite their intrinsic diffraction limit because they are fast and can be applied to a broad set of samples in liquid phase.

As an example of an optical method for investigating nanoparticles, dynamic light scattering (DLS) [1] makes use of temporal correlations in the light scattered or emitted by an ensemble of diffusing particles. In this method, the particle size is extracted from the statistical analysis of the autocorrelation function of the light intensity. Today, DLS is the most commonly used technique in particle sizing, as it is easy to use and offers high accuracy for averaged values. However, this method has a low size resolution, thus, confronting limits in the analysis of polydisperse solutions.

A more recent approach, referred to as nanoparticle tracking analysis (NTA), quantifies the diffusion constant by recording and analysing the trajectories of single particles [2]-[3]. NTA can employ various imaging methods and does not require extensive calibration, although a good knowledge of the technical parameters such as camera pixel size and frame rate, as well as temperature and viscosity of the medium is required for improving the measuring results.

The oldest imaging method for the detection of non-emitting nanoparticles is dark-field microscopy (DFM) [4]. The DFM signal is proportional to the scattering cross-section $\sigma_{sca}$ of a particle and, thus, scales as de, where d represents a cross-sectional dimension of the particle, like the diameter if spherical nanoparticles are considered for simplicity. Currently, one of the leading NTA instrumentation (NanoSight, Malvern Instruments) uses DFM and is validated for gold nanoparticles (GNP) as small as 30 nm and polystyrene (PS) particles larger than 60 nm ([3], [5]). Holography has also been used for imaging and tracking particles, but the reported sensitivity corresponds to the scattering cross-section of a PS particles with a relatively large diameter d of about 300 nm ([6] to [9]). Despite the application of advanced algorithms, detection and distinguishing of particles in polydisperse solutions, especially in the sub-30 nm regime for GNPs and sub-100 nm regime for particles of lower refractive index, remain a challenge.

Thus, more than three decades after the debut of nanotechnology, characterization of nanoparticles remains a challenge in many applications, particularly if high throughput and non-invasiveness are desirable.

Another known optical signal that has been used for investigating nanoparticles is obtained by interferometric detection of scattering (ISCAT) ([10] to [11]) which has demonstrated ultrahigh sensitivity for nanoparticles down to single proteins ([12], [13]). Up to now, iSCAT microscopy had a limited application range, in particular covering the detection of single particles or monitoring particle motion only ([14], [15]).

OBJECTIVE OF THE INVENTION

The objective of the invention is to provide an improved method of determining nanoparticle properties of nanoparticles included in a sample, wherein disadvantages of conventional techniques are avoided. In particular, the method is to be capable of determining nanoparticle properties with an improved size resolution, e.g. like an EM method, while keeping advantages of optical methods in terms of sample preparation and in-situ measurements. Furthermore, the method is to be capable of delivering extended information about the nanoparticles, like e.g. about the size, the scattering cross section and the refractive index of the nanoparticles. The method is to be capable of facilitating investigations of plural nanoparticles in monodisperse or polydisperse solutions and/or determining properties of nanoparticles with a size below diffraction limit, e.g. below 100 nm. According to further aspects, nanoparticle properties are to be determined with increased precision and/or speed and/or with easy implementation of the measuring setup. Furthermore, the objective of the invention is to provide a correspondingly improved test apparatus for determining nanoparticle properties of nanoparticles included in a sample, wherein disadvantages of conventional techniques are avoided.

SUMMARY OF THE INVENTION

The above objectives are solved by a method and/or a test apparatus for determining nanoparticle properties of nanoparticles included in a sample, comprising the features of the invention.

According to a first general aspect of the invention, the above objective is solved by a method of determining nanoparticle properties of nanoparticles included in a sample, comprising a step of collecting sequential frames of images by employing an interferometric microscope device, wherein the sample is illuminated with illumination light from a coherent light source device and the images are created by scattering light from the nanoparticles superimposed with non-scattered reference light, said scattering light and reference light having a wavelength larger than a cross-sectional dimension of the particles.

Furthermore, the method of determining nanoparticle properties comprises a step of tracking the nanoparticles in the sequential frames of images, wherein at least one interferometric point spread function (iPSF) feature of each of the nanoparticles is established and nanoparticle trajectory motion data are determined for each nanoparticle, comprising the nanoparticle positions in each frame. In particular, the trajectory motion data comprise the nanoparticle positions and collection times of related frames for all nanoparticles. For each nanoparticle, a nanoparticle size (a quantity representing the nanoparticle size) is calculated from the trajectory motion data of the nanoparticle and an interferometric nanoparticle contrast is calculated from the at least one iPSF feature of the nanoparticle. Advantageously, the nanoparticle motion trajectory data can be determined from the centres of iPSFs when the nanoparticles move in a focal plane of the microscope device or when the nanoparticles move out of the focal plane.

Furthermore, the method of determining nanoparticle properties comprises a step of creating a two-parametric nanoparticle scatter plot, wherein each nanoparticle has a plot position based on the calculated nanoparticle size and the calculated interferometric nanoparticle contrast and all nanoparticles create a distribution of nanoparticle plot positions, and a step of analysing the distribution of nanoparticle plot positions for providing the nanoparticle properties. Analysing the distribution of nanoparticle plot positions preferably comprises estimating the nanoparticle properties directly from the nanoparticle plot positions, e.g. from the occurrence of separable subdistributions (clouds of positions) and/or from histograms of the nanoparticle plot positions and/or from numerical simulations of the nanoparticle plot positions or data derived therefrom, like e.g. isosurfaces of constant nanoparticle sizes and nanoparticle scattering cross-sections, with models, like e.g. generalised Mie theory, including the nanoparticle properties as parameters.

According to a second general aspect of the invention, the above objective is solved by a test apparatus being configured for determining nanoparticle properties of nanoparticles included in a sample, comprising an interferometric microscope device, a recording device and an analysing device. The interferometric microscope device comprises a coherent light source device, imaging optics, a sample receptacle and a detector camera device, wherein the coherent light source device is arranged for illuminating the sample in the sample receptacle with illumination light, and the detector camera device is arranged for collecting sequential frames of images created by scattering light from the nanoparticles superimposed with non-scattered reference light, said scattering light and reference light having a wavelength larger than a cross-sectional dimension of the particles.

The analysing device is arranged for establishing at least one interferometric point spread function (iPSF) feature of the nanoparticles, tracking the nanoparticles in the sequential frames of the images and determining nanoparticle trajectory motion data for each nanoparticle, comprising the nanoparticle positions in each frame.

The analysing device is further arranged for calculating a nanoparticle size from the trajectory motion data for each nanoparticle, calculating a nanoparticle scattering cross-section from the at least one iPSF feature for each nanoparticle, creating a two-parametric nanoparticle scatter plot, wherein each nanoparticle has a plot position determined by the calculated nanoparticle size and the calculated interferometric nanoparticle contrast thereof and all nanoparticles create a distribution of nanoparticle plot positions, and analysing the distribution of nanoparticle plot positions for providing the nanoparticle properties. Preferably, the test apparatus or an embodiment thereof is configured for executing the method according to the first general aspect of the invention or an embodiment thereof.

The term "iPSF feature" generally refers to a characteristic quantity of the iPSF, like preferably at least one of an iPSF contrast, in particular a height of a central lobe of the iPSF, an integrated iPSF, in particular an overall brightness of the iPSF, and an iPSF shape, in particular shape features in a central lobe and side lobes of the iPSF. The iPSF feature allows the calculation of the interferometric nanoparticle contrast, like preferably an interferometric scattering (ISCAT) contrast. Alternatively, another interferometric nanoparticle contrast can be calculated, like a contrast obtained by interferometric holography.

The term "interferometric nanoparticle contrast" generally refers to a quantity indicating how large the measured iPSF signal rises above the background level of the measurement, i. e. of the frame collection with the interferometric microscope device. In particular, the "interferometric nanoparticle contrast" may be a quantity determined by the scattering cross-section of the nanoparticles. Examples of the contrast are a maximum positive contrast indicating how high the central lobe of a bright iPSF peak stands out above the background level, or a maximum negative contrast indicating how low the central lobe of a dark peak falls below the background level, or a root mean square (RMS) contrast. Particularly preferred, a maximum interferometric nanoparticle contrast is calculated so that advantageously the moment is captured, where the particle is in the focal plane of illumination and the effect of contrast changes from frame to frame due to particle movements out of the focal plane can be avoided.

The sample is a quantity of a liquid, like e.g. water, a watery solution, an organic liquid or mixture thereof, including the nanoparticles to be investigated in a dispersed manner. Resulting from thermally induced collisions of the nanoparticles with surrounding molecules of the liquid, the nanoparticles move within the liquid, e.g. due to Brownian motion. Generally, the nanoparticle motion is a diffusion within the liquid, optionally superimposed with other forces within the liquid, like e.g. electric and/or magnetic and/or optical forces.

For collecting sequential frames of images of the sample including the nanoparticles, the sample is arranged in a volume that can be imaged with the interferometric microscope device, e.g. in a free droplet resting on a substrate or in a sample receptacle, like a chamber delimited by transparent walls and/or a compartment structure of a fluidic microsystem. The images are created by collecting the superposition of the scattering light from each of the nanoparticles (illumination light scattered by the nanoparticles) and the non-scattered reference light, e.g. light from a reference light source or light reflected by a surface delimiting the liquid. Accordingly, the images can be understood as interference patterns created by the imaged sample, in particular by the nanoparticles in the sample.

The inventors have found that the combination of the measurement concept of NTA in particular with interferometric scattering (ISCAT) microscopy results in substantial advantages for investigating plural nanoparticles in liquid samples. While iSCAT microscopy has been used for tracking tasks already ([14], [15]), these previous measurements were directed on monitoring and characterizing the particle motion only. In contrast to the conventional techniques, the invention uses nanoparticle trajectory motion data for calculating the nanoparticle size for each nanoparticle.

Generally, the nanoparticles comprise particles with a characteristic cross-sectional dimension, like diameter, in a range from 5 nm to 500 nm, in particular in a range from 5 nm to 150 nm. For spherical or nearly spherical nanoparticles, the characteristic cross-sectional dimension is the diameter. The inventors have found that in most practical applications, the nanoparticles can be analysed with the assumption of a spherical shape of the nanoparticles. Alternatively, non-spherical nanoparticles can be described with another cross-sectional dimension thereof, like an average diameter or a main axis length of an ellipsoid-shaped or rod shaped nanoparticle. The calculated "nanoparticle size" generally refers to the characteristic cross-sectional dimension of the nanoparticle determining the motion, in particular the diffusion, thereof. Based on the physical laws of motion in the liquid, governing the nanoparticle motion, for example, free diffusion, the nanoparticle size is calculated from the trajectory data of the nanoparticle. In particular, the diffusion constant can be obtained from the nanoparticle trajectory motion data, so that the nanoparticle size and optionally further nanoparticle features can be determined with an unprecedented accuracy and tolerance, not only in monodisperse, but also in polydisperse mixtures of nanoparticles.

Furthermore, the inventors have found a particular advantage of iSCAT microscopy for nanoparticle size determination. Compared with conventional imaging methods, like dark-field imaging, iSCAT microscopy allows one to track longer path lengths. The more steps the nanoparticle trajectories can be monitored, i. e. the more sequential frames of images of the sample including the nanoparticles are collected, the more precise is the determination of the nanoparticle size, in particular the determination of the diffusion constant. Accordingly, precision or speed or both of them can be improved by imaging the sample via iSCAT microscopy.

According to the invention, the interferometric nanoparticle contrast, preferably the nanoparticle scattering cross-section is calculated for each nanoparticle on the basis of the detected at least one iPSF feature thereof. As a further particular advantage of the invention, the interferometric nanoparticle contrast, preferably the nanoparticle scattering cross-section, and the nanoparticle size are calculated independently from each other. Advantageously, with a single iSCAT tracking measurement two parameters, i. e. the interferometric nanoparticle contrast and the nanoparticle size, are obtained which allow an improved analysis by creating the two-parametric nanoparticle scatter plot. The inventors have found that the limitations of overlapping one-dimensional histograms of nanoparticle sizes obtained with conventional techniques can be overcome by histograms obtained from the two-parametric nanoparticle scatter plot. The two-parametric nanoparticle scatter plot allows one to identify one or more population(s) of nanoparticles and to analyse, in particular decompose, even overlapping histograms. With the invention, histograms of size and contrast distributions can be combined, thus providing nanoparticle features with increased precision and reproducibility and/or allowing an analysis of nanoparticle distributions with similar features, e.g. mean diameters.

Advantageously, by combining iSCAT microscopy and in particular NTA, the inventors have found an all-optical method (interferometric NTA, iNTA) for sensitive and precise determination of the size and optionally further features, like refractive index of nanoparticles, in liquid environments. The inventors have shown the advantages of the invention by characterizing samples of colloidal gold, polystyrene and silica particles and comparing the results with those of conventional methods. Furthermore, the inventors have shown the capability of deciphering multi-component samples and polydispersions, including e.g. extracellular vesicles in human urine and exosomes from *Leishmania* parasites.

According to the invention, the collected plurality of different frames of images provides a sequence of iPSF features for each particle. Preferably, the step of calculating the interferometric nanoparticle contrast of each particle comprises determining an interferometric scattering (ISCAT) contrast from each iPSF feature, and determining a characteristic iSCAT contrast, in particular a maximum iSCAT contrast, among the iPSF features of each particle in different frames of images, wherein the scattering cross section of each particle is calculated from the characteristic iSCAT contrast. Advantageously, by employing the characteristic iSCAT contrast, the calculation of the scattering cross sections of the particles is facilitated. Instead of using the maximum positive isCAT contrast, another characteristic iSCAT contrast, like a maximum negative iSCAT contrast, can be employed.

The two-parametric nanoparticle scatter plot created according to the invention is a map spanned by two dimensions (or axes) being determined by the calculated nanoparticle size and the calculated nanoparticle scattering cross-section. The nanoparticle scatter plot may comprise at least one of a graphical representation (e.g. print or display representation) and a data representation (e.g. stored data field or table). Basically, the calculated nanoparticle size and the calculated scattering cross section can be directly employed as the dimensions of the nanoparticle scatter plot.

Preferably, for each nanoparticle, a scattering cross section is calculated from the interferometric nanoparticle contrast thereof. The scattering cross section can be calculated using a calibration measurement performed with nanoparticles of known size and refractive index. Alternatively, one could calculate the scattering cross section entirely by use of well determined setup dependent parameters which could be measured separately.

Preferably, the calculated nanoparticle size and a function of the interferometric nanoparticle contrasts, preferably the scattering cross sections, of the nanoparticles are employed as the dimensions of the nanoparticle scatter plot. Thus, according to a preferred embodiment of the invention, the plot positions of the particles in the two-parametric nanoparticle scatter plot are determined by the nanoparticle sizes and values of the function of the interferometric nanoparticle contrasts, in particular the scattering cross sections of the nanoparticles, in particular third root values of the interferometric nanoparticle contrasts, in particular the sixth root values of scattering cross sections of the nanoparticles. Employing the function of the interferometric nanoparticle contrasts, in particular the scattering cross sections offers advantages in terms of increasing the resolution of nanoparticle positions in the nanoparticle scatter plot.

Advantageously, plural nanoparticle properties to be determined are available. According to further preferred embodiments of the invention, the analysing step comprises calculating at least one of at least one mean nanoparticle size of the nanoparticles, at least one standard deviation of nanoparticle sizes of the nanoparticles, at least one mean refractive index of the nanoparticles, and at least one standard deviation of refractive indices of the nanoparticles. Advantageously, for most applications of interest, each of these properties or any combination thereof allows a sufficient characterization of the nanoparticles. As a further advantage, these properties or any combination thereof can be derived directly from the nanoparticle scatter plot or from histograms derived therefrom.

With further preferred embodiments, more complex properties of the nanoparticles can be obtained. According to a first variant, dimensions and/or refractive indices of a multi-layer structure of the nanoparticles can be calculated by employing generalized Mie theory and predetermined nanoparticles' parameters included in the generalized Mie theory. By the parameters, like e.g. number of layers and/or refractive index of thickness of some layers, assumptions and further information are introduced to the application of the generalized Mie theory for determining the dimensions and refractive indices of the layers involved. Nanoparticles with a multi-layer structure have a core and at least one layer on the core. Advantageously, the invention allows estimating or at least finding bounds of the diameter and/or refractive index of the core and thickness and/or refractive index of the at least one layer. Based on a-priori-knowledge on the nanoparticles, e.g. the material(s) thereof, the estimations can be improved. The generalized Mie theory comprises general expressions for electromagnetic scattering by the nanoparticles which represent the nanoparticle scattering cross-section in dependency of the dimensions and refractive indices of the nanoparticle layers. Alternatively or additionally, an effective surface layer produced in suspension, in particular a hydration layer, can be calculated that is accumulated on the nanoparticle surfaces.

According to further advantageous embodiments of the invention, the nanoparticles comprise at least two nanoparticle groups, wherein the mean nanoparticle size, the standard deviation of nanoparticle sizes, the mean refractive index, the standard deviation of refractive indices, a mean nanoparticle shape and/or a nanoparticle material of the nanoparticles of one of the nanoparticle groups differ from the mean nanoparticle size, the standard deviation of nanoparticle sizes, the mean refractive index, the standard deviation of refractive indices, the mean nanoparticle shape and/or the nanoparticle material of the nanoparticles of another one of the nanoparticle groups. With these embodiments, the analysing step comprises identifying the nanoparticle groups. In other words, the different nanoparticle groups can be identified as separable distributions in the nanoparticle scatter plot. Advantageously, nanoparticle groups can be identified even if the distributions of properties thereof, e.g. the size distributions, overlap and/or if only small differences of average properties, e.g. mean nanoparticle sizes, of the distributions occur. As an example, gold nanoparticles with average sizes of 10 nm and 15 nm could be reliably separated with the inventive method.

Particularly preferred, the nanoparticle groups are not only identified, but the mean nanoparticle sizes, the standard deviations of nanoparticle sizes, the mean refractive indices, the standard deviations of refractive indices, the mean nanoparticle shapes and/or the nanoparticle materials of the nanoparticle groups are calculated.

According to a further advantageous embodiment of the invention, a nanoparticle size histogram and a nanoparticle scattering cross-section histogram are created and at least one of the histograms is decomposed. Preferably, the nanoparticle scattering cross-section histogram is created based on sixth root values of the scattering cross-sections of the nanoparticles. Alternatively or additionally, the analysing step may comprise creating a nanoparticle size histogram and an effective refractive index histogram and decomposing at least one of the histograms. Creating the histograms comprises providing a representation, e.g. a graphical representation, of the distribution of the nanoparticle sizes and a representation of the distribution of the nanoparticle scattering cross-sections and/or effective refractive indices occurring in the sample to be investigated. The histograms comprise frequency distributions of the nanoparticle sizes and the nanoparticle scattering cross-sections and/or effective refractive indices. Decomposing the histograms comprises modelling the histograms by a fitting routine, like a Gaussian Mixture Model. Histograms can be analysed using e.g. the Gaussian Mixture Model to extract different components of a nanoparticle mixture. As a particular advantage of the invention, decomposing the histograms is facilitated as the histograms are obtained by firstly creating the two-parametric nanoparticle scatter plot and then decomposing the histograms thereof.

If, according to further optional features of the invention, the analysing step comprises steps of applying at least one of a pattern recognition and a machine-learning-based data analysis on the distribution of plot positions, advantages in terms of automation, processing speed and reproducibility of determining nanoparticle properties can be obtained. The pattern recognition may comprise e.g. comparing the distribution of nanoparticle plot positions with reference data from pre-known reference samples, recognizing a characteristic distribution shape and/or size and identifying nanoparticle properties based on properties of the pre-known reference samples. The machine-learning-based data analysis may comprise e.g. input of the two-parametric nanoparticle scatter plot to a neural network trained with reference data from pre-known reference samples and obtaining the nanoparticle properties on the basis of the output of the neural network.

Further advantages of the invention result from the broad range of available nanoparticles which can be investigated. With preferred examples, the nanoparticles comprise spherical nanoparticles, non-spherical nanoparticles, inorganic nanoparticles, organic nanoparticles, nanoparticles with surface layers and/or nanoparticles with a multi-layer structure.

According to a further advantageous embodiment of the invention, a step of flowing the sample through a field of view of the interferometric microscope device can be provided. Advantageously, collecting the sequential frames of images and tracking the nanoparticles in the sequential frames of images can be executed with a sample moving through the field of view, thus allowing an increased throughput of the measurement. Preferably, a laminar sample flow is employed, so that advantages for calculating the nanoparticle size from the trajectory motion data are preserved.

Advantageously, a multi-wavelength measurement can be executed, wherein the step of collecting sequential frames of the images is conducted with the illumination light having at least two different wavelengths, and the step of analysing the distribution of nanoparticle plot positions is executed at the different wavelengths. The step of collecting sequential frames of the images can be repeated with the at least two different wavelengths, or the illumination light can include the at least two different wavelengths, wherein the step of collecting sequential frames of the images is conducted once and the scattering light superimposed with the reference light is collected with spectral separation. With these variants, at least two nanoparticle scatter plots are obtained sequentially or simultaneously. As the nanoparticle scattering cross-section depends on the wavelength of the scattered light, an additional parameter for determining the nanoparticle properties is obtained, thus increasing the precision and reproducibility of the measurement.

With a further variant of the invention, the nanoparticle properties to be obtained include spectroscopic information of the nanoparticles. Preferably, this embodiment is employed with the multi-wavelength measurement. The spectroscopic information comprises e.g. spectral absorption and/or transmission data of the sample including the nanoparticles or the nanoparticles alone. Advantageously, the spectroscopic information provides a further characterization of the nanoparticles.

Preferably, sample fluorescence can be detected with the interferometric microscope device, in particular for identifying a material content of the nanoparticles. Detecting the sample fluorescence may comprise exciting fluorescence with the illumination light or an additional excitation light and measuring fluorescence spectra or specific fluorescence bands of the nanoparticles. Advantageously, the fluorescence detection allows an identification of at least one substance included in the nanoparticles.

According to a further optional feature of the invention, the illumination light is linearly polarized. Polarization influences scattering of the illumination light, so that yet another parameter for determining the nanoparticle properties is obtained. Particularly preferred, the step of collecting sequential frames of the images is conducted at two orthogonal polarizations. Advantageously, the two polarizations can be recorded separately but simultaneously.

Advantageously, the method of the invention may include a step of estimating a nanoparticle concentration, in particular the volume concentration, in the sample. The sequential frames of images, in particular the trajectory motion data, provide the number of detected nanoparticles in the sample, and the sample volume can be estimated based on the imaging volume covered by the microscope device. The nanoparticle concentration can be calculated from the number of detected nanoparticles and the imaging volume.

According to a further preferred feature of the invention, the coherent light source device is a pulsed light source device creating illumination light pulses, e.g. with a pulse duration in a range from 10 fs to 1000 ns and a repetition frequency in a range from 1 kHz to 1000 MHz. Employing illumination light pulses may have advantages in terms of providing high illumination intensities. Particularly preferred, the sequential frames of the image are collected synchronized with the illumination light pulses.

The inventive method may be combined with determining of further properties of the sample and/or the nanoparticles. According to a first variant, the trajectory motion data are analysed to determine viscoelastic properties of the sample. Additionally or alternatively, according to a second variant, the trajectory motion data are analysed to determine the nanoparticles geometry.

These variants of the invention preferably are obtained by an application of external forces, like optical field forces or dielectric forces, and/or potentials, like electric potentials, which can affect the particle motion beyond random diffusion. The trajectory of the particle obtained from the analysis of the iPSF features provides information about the interaction of the particle with its environment and the properties of the latter e.g., its viscoelasticity.

Advantageously, a sample temperature can be employed as a further parameter of the measurement. Preferably, the step of collecting sequential frames of the images is conducted with at least two different temperatures of the sample. The nanoparticle motion depends on the sample temperature, so that multiple trajectory motion data can be obtained from the sequential frames of the images.

If, according to further optional features of the invention, a step of controlling a balance between portions of the scattering light from the nanoparticles and the reference light is provided, advantages in terms improving the signal to noise ratio of collecting the iPSF features are obtained.

Features disclosed in the context of the method of determining nanoparticle properties and the embodiments thereof also represent preferred features of the inventive apparatus for determining nanoparticle properties and vice versa. The aforementioned aspects and inventive and preferred features, in particular with regard to the execution of the method of determining nanoparticle properties, therefore also apply for the apparatus. The preferred embodiments, variants and features of the invention described above are combinable with one another as desired.

BRIEF DESCRIPTION OF THE DRAWINGS

Further details and advantages of the invention are described with reference to the attached drawings, which show in FIG. 1: a schematic illustration of features of an apparatus for determining nanoparticle properties according to preferred embodiments of the invention;

FIG. 3: experimental results of investigating monodisperse particle samples;

FIG. 4: experimental results of investigating polydisperse particle samples.

DESCRIPTION OF PREFERRED EMBODIMENTS

Figure 1:
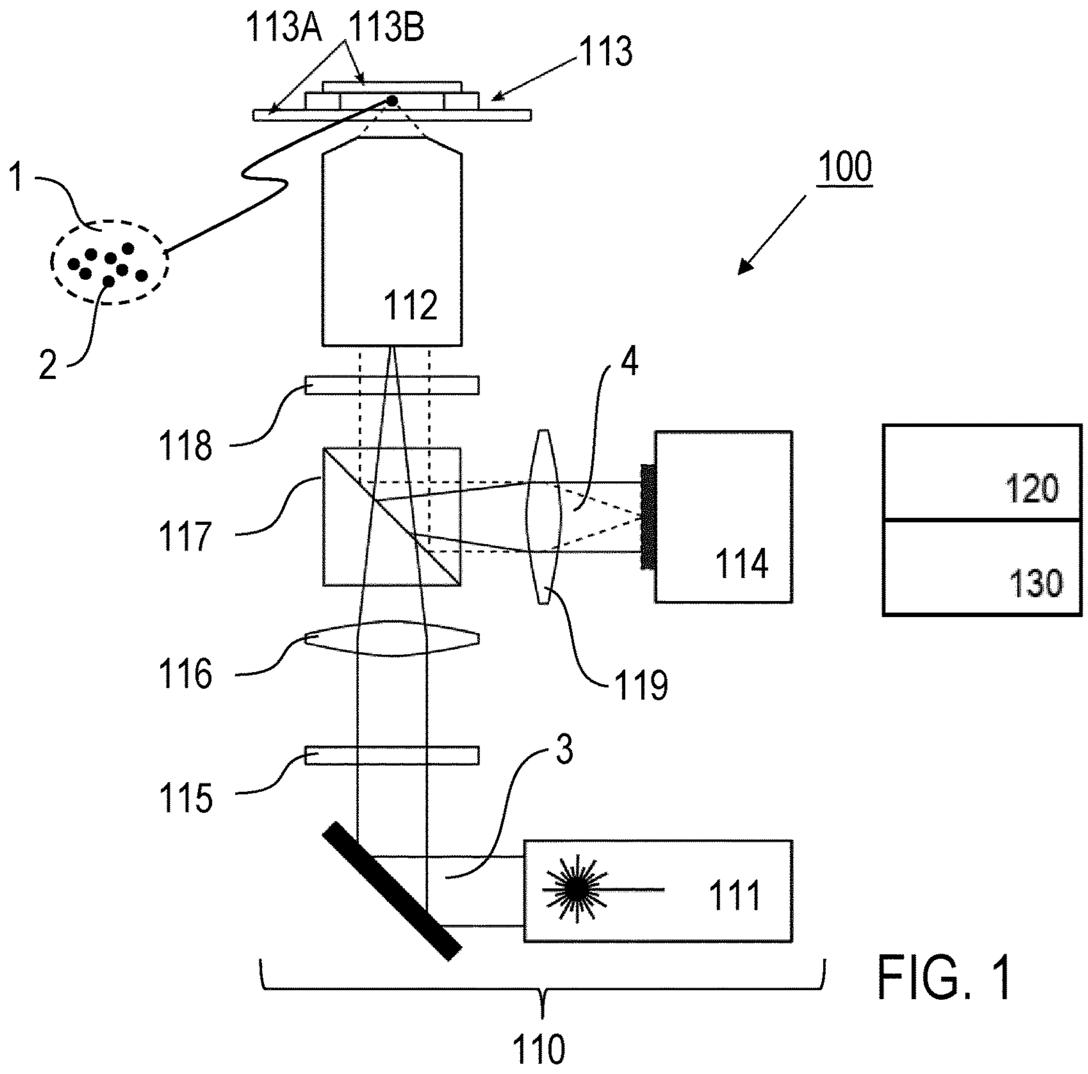

Features of preferred embodiments of the invention are described in the following with reference to the apparatus for determining nanoparticle properties as illustrated in FIG. 1 and the application thereof for executing the method of determining nanoparticle properties. It is noted that the implementation of the invention is not restricted to the configuration of the apparatus illustrated in an exemplary manner. In particular, embodiments of the invention can be modified with regard to the design of the interferometric microscope device, in particular the illumination and camera components thereof, the sample receptacle and optional further components, like a fluorescence detection and/or a transmission measurement set up. In particular, iNTA can be combined with sensitive fluorescence measurements to extract further information about the particles under study. The invention method can be further modified by several measures, e.g., the use of particle confinement strategies, shorter laser wavelength and higher laser power to increase the exposure time and signal-to-noise ratio. These measures will give access to the high-resolution analysis of weakly scattering nanoparticles in a fast, precise and non-invasive fashion for a wide range of applications. Furthermore, the measurements can be repeated by at least two different temperatures and/or at least two wavelengths of the illumination light, thus increasing the precision of determining the nanoparticle properties.

The test apparatus 100 for determining nanoparticle properties schematically shown in FIG. 1 comprises an interferometric microscope device 110, in particular with a coherent light source device 111, imaging optics 112, a sample receptacle 113 including the sample 1 with nanoparticles 2, and a detector camera device 114.

Generally, according to embodiments of the invention, the test apparatus 100 further comprises a recording device 120 and an analysing device 130, which can be provided by a common computer unit or separate computer units. The recording device 120 is connected with the detector camera device 114 and it is configured for recording images from the detector camera device 114. The analysing device 130 is arranged for tracking the nanoparticles in the recorded images and analysing the nanoparticle paths. At least the recording device 120 or both of the recording and analysing devices 120, 130 is/are coupled with the detector camera device 114. Furthermore, at least one of the recording and analysing devices 120, 130 can be coupled with other components of the test apparatus, like the light source device 111, e.g. for creating various illumination conditions. The illumination conditions may differ in particular in terms of power, e.g. for controlling a balance between portions of the scattering light from the nanoparticles and the reference light, and/or illumination wavelength.

With the test apparatus 100, sequential frames of images are collected, processed and analysed. To this end, the sample 1 is illuminated with the illumination light 3 from the coherent light source device 111. Scattering light from the nanoparticles 2 being superimposed with non-scattered reference light provides the images being collected for a predetermined exposure time. With the analysing device 130, the nanoparticles 2 are tracked in the sequential frames of images. Interferometric point spread function (iPSF) features of the nanoparticles 2 are established and nanoparticle trajectory motion data are determined for each nanoparticle 2 with the analysing device 130. Furthermore, with the analysing device 130, nanoparticle sizes and nanoparticle scattering cross-sections of the nanoparticles 2 are calculated from the trajectory motion data, in particular from the iPSF features of the nanoparticles. Furthermore, a two-parametric nanoparticle scatter plot 200 (e.g., see FIG. 4C) is created with the analysing device 130, and the distribution of nanoparticle plot positions is analysed with the analysing device 130 for providing the nanoparticle properties to be obtained.

With more details, the coherent light source device 111 is a low coherence light source creating the illumination light 3 with an emission wavelength of 525 nm (laser diode, manufacturer: Lasertack, Germany). The illumination light 3 is focused with a lens 116 onto the back focal plane of the imaging optics 112, which comprises a 63*x* oil immersion objective (NA 1.46, manufacturer Zeiss, Germany). An ND filter 115 is arranged for adjusting the illumination light power. A λ/2 waveplate (not shown in the FIG. 1) located right after ND filter 115 is used to match the polarization of the incident illumination light 3 to be transmitted through the polarization-dependent beam splitter (PBS) 117. A λ/4 waveplate 118 changes the polarization of the illumination light 3 from linear to circular.

The sample receptacle 113 comprises a chamber formed by a microscope slide 113A, a coverslip 113B and a spacer (e.g. silicon gasket) therebetween. The sample 1 including the nanoparticles 2 (see enlarged schematic view) is arranged in the sample receptacle 113. The circularly polarized illumination light 3 is focused into the sample 1 with the imaging optics 112. The focal plane of the imaging optics 112 is typically placed above the coverslip (e.g. a few micrometers) and is preferably stabilized with an active focus lock. In particular, to adjust the focal plane position above the coverslip 113B, the illumination light 3 is focused on the coverslip 113B and then a piezoelectric stage is used to position the focal plane at a position (e.g. about at 1 μm) above the coverslip 113B. To lock the focus position, a position sensing detector (PDP90A), combined with a red laser operating in TIR mode (CPS670F) and a PSD auto aligner (TPA101) is employed.

The illumination light 3 is partially reflected by the coverslip (providing the reference light) and partially scattered by the nanoparticles 2, reversing its handedness. The scattering light 4 superimposed with the reflected reference light is collected with the imaging optics 112. Upon going through the λ/4 wave plate 118, the polarization changes back to linear, but now rotated by 90°. The scattering light 4 being superimposed with the reflected reference light is reflected by the PBS 117 towards the detector camera device 114, which comprises a CMOS camera chip (e.g. type: MV1-D1024E-160-CL-12, manufacturer Photon Focus, Switzerland). As an example, a field of view (FoV) of 128 pixels×128 pixels is used, which is equivalent to a sample area of 7×7 $\mu m^2$. The recording speed, e.g. 5000 frames per second (fps), typically is limited by the camera read out time. By recording sequential frames of images of the scattering light superimposed with the reference light for an exposure time of e.g. 1 s, trajectories with more than 100 localizations can be captured even for 10 nm nanoparticles 2 and with more than 1000 localizations for nanoparticles 2 larger than 20 nm.

With an example of a practical measurement, the exposure time is set to the maximum possible value of $t_{exp}$=80 μs for the frame rate of 5000 fps. Two (or six) hundred 1 second long sequences of frames of images are recorded for monodisperse (or polydisperse) samples. More sequences of frames of images (2300) can be recorded for diluted samples, like e.g. an urine sample (see below). For single-particle measurements, an image trigger can be used which is included in the video acquisition software (pyLabLib Camcontrol) to start saving the frames 0.5 s before the particle crosses the center of FoV. For polydisperse solution measurements, a trigger is not used but rather a sequence of frames of images can be recorded continuously.

The collected frames of images of the sample 1 are processed with the analysing device 130. Processing the frames of images comprises determining nanoparticle trajectory motion data for each nanoparticle 2 with the analysing device 130, in particular determining a sequence of nanoparticle positions and related collection times of each nanoparticle 2, obtained from each of the frames. Furthermore, a nanoparticle size is calculated from the trajectory motion data and a nanoparticle scattering cross-section is calculated from iPSF features of the nanoparticles with the analysing device 130, as outlined in the following.

The nanoparticle sizes (e.g. diameters) are calculated based on the diffusion constant D determined from the trajectory motion data. The diffusion constant D of a nanoparticle in a liquid is described by the Stokes-Einstein (SE) equation $$D = \frac{k_B T}{3\pi\eta d} \tag{1}$$

where kB is the Boltzmann constant, T and η are the temperature and viscosity of the fluid, respectively, and d signifies the (apparent) diameter of the nanoparticle [4]. Thus, by evaluating D from the mean squared displacement (MSD) of a particle trajectory (see e.g. FIG. 2B), the nanoparticle size d is calculated. Because the measurement precision is improved with an increasing number of trajectory points, fast recordings obtained with the above set-up of FIG. 1 are preferred. Particularly preferred, high-speed imaging is combined with maintaining a large SNR to provide low localization errors [16]. This is where ISCAT microscopy employed according to the invention provides a decisive advantage due to its ability to track nanoparticles with a high spatial precision and temporal resolution [11].

In practice, a dilute suspension of nanoparticles 2 is introduced in the closed chamber of the sample receptacle 113. The nanoparticles 2 diffusing in the sample 1 are imaged with the detector camera device 114. The trajectory lengths of the nanoparticles 2 are predominantly limited by the axial diffusion of the nanoparticles. Diffusion constant D and thereby d is extracted by fitting an MSD plot for individual trajectories. For monodisperse samples, a mean diffusion constant $D^{-}$ as well as a localization error can be evaluated by fitting averaged MSD plots, weighted by the trajectory length. For polydisperse samples, the knowledge of the interferometric contrast C is additionally exploited. Because the interferometric contrast C modulates in the axial direction as the particle traverses the illumination area, the maximum positive contrast from each trajectory is preferably used for the subsequent analysis of the data.

Figure 2:
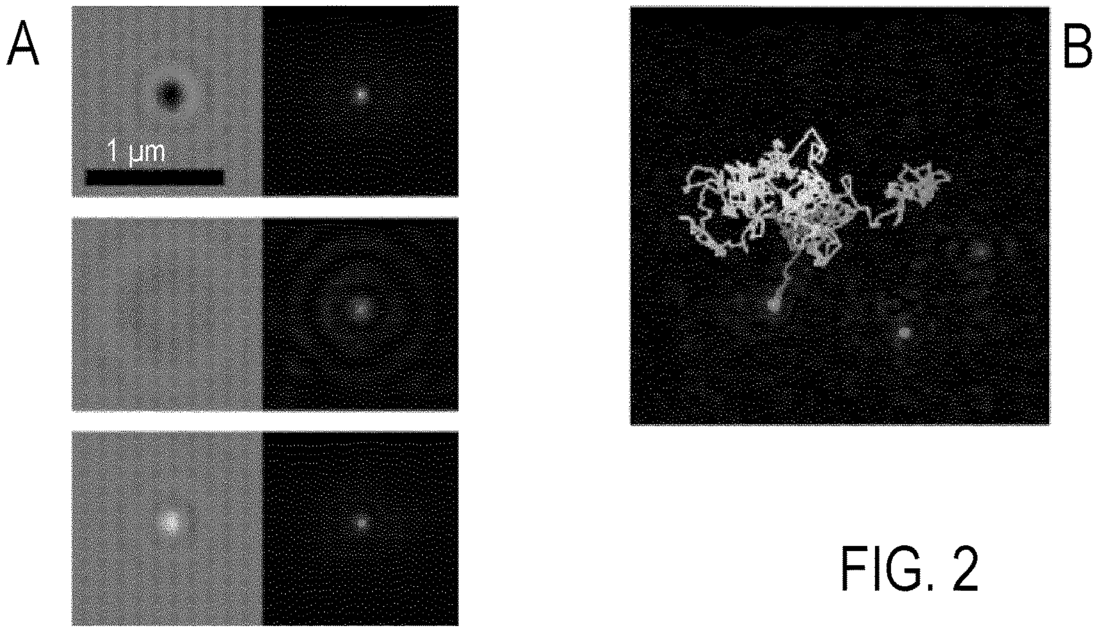
FIG. 2: illustrations of collecting trajectory motion data.

FIG. 2A illustrates three examples of the interferometric point-spread function (iPSF) that results from the interference of planar (reflected from the sample interface) reference light waves and spherical (scattered by the particle) waves ([11], [17]). The iPSFs shown in the left column of FIG. 2A vary qualitatively depending on the particle position relative to the coverslip 113B and the focal plane [17]. To localize an iPSF in a given image, for instance radial variance transform (RVT) can be applied, which converts the iPSF into bright spots [18], as shown in the right column of FIG. 2A. An example of a trajectory is overlaid in FIG. 2B.

The nanoparticle scattering cross-section calculated for each nanoparticle is obtained from the iSCAT intensity, which is derived from the frames of images as follows. The ISCAT intensity recorded on the detector reads $$I_{det} \propto |E_{ref}|^2 + |E_{sca}|^2 + 2|E_{ref}||E_{sca}|\cos\theta$$

where $I_{ref}=|E_{ref}|^2$ and $I_{sca}=|E_{sca}|^2$ denote the intensities of the reference and the scattering light, respectively. The phase θ stands for the relative phase between the two fields, which can arise from a Gouy phase in the imaging system, material dependent scattering phase and a traveling phase component stemming from the axial position of the nanoparticle. This expression is similar to the signal in holography. However, contrary to the conventional use of holography in imaging, iSCAT works have employed interferometry to detect weak signals from nanoparticles [11]. An important feature that has made this possible is using a common-path arrangement, which is usually implemented in the reflection mode [11]. The ISCAT contrast is defined as $$C = \frac{I_{det} - I_{bg}}{I_{bg}}$$

where $I_{bg}$ is the intensity of the image background in the vicinity of the nanoparticle image. Therefore, C is proportional to $|E_{sca}/E_{ref}|$. For a Rayleigh particle, $E_{sca}$ is proportional to the polarizability α, resulting in $C \propto \alpha \propto V \propto d^3$. Generally, the maximum iSCAT contrast and the scattering cross-section are related via:

$$C = \beta^2\sigma_{scat} + 2\beta\sqrt{\sigma_{scat}}$$

wherein β depends only on the setup parameters and can be calculated a priori or using a calibration with particles of known size and refractive index.

The iSCAT signal strength is expressed as the interferometric contrast (C) and directly reports on the scattering cross-section of the particle. For uniform Rayleigh particles with kd<<1, where k is the wavenumber, C of the central iPSF lobe is proportional to the polarizability α given by equation (2) (see [10])

$$\alpha = 3V\left(\frac{n_p^2 - n_m^2}{n_p^2 + 2n_m^2}\right) \quad (2)$$

Here, V denotes the particle volume, and np and nm are the refractive indices of the nanoparticle and its surrounding medium, respectively [19]. For particles with kd large or about 1 and for multi-layered particles, a generalized Mie theory describes the scattering strength (see below). The inventors have found that the information about C can be employed in deciphering various species and determining their refractive indices in a polydispersion.

FIG. 3 illustrates experimental results obtained with a sample including commercially available monodisperse gold nanoparticles (GNP). FIG. 3A shows the mean square displacement (MSD) of GNP diffusion versus delay time for GNP samples of different sizes. Thin lines show the MSD extracted from each individual trajectory that contained at least 25 localization events. Thick lines A to H display the weighted linear average (by trajectory length), wherein free diffusion is confirmed. Diffusion constants extracted from the fits are listed in the legend.

FIG. 3B shows diffusion constants D for GNPs of various diameters, extracted from the data in FIG. 3A, versus the nominal GNP diameter $d_{nom}$ provided by the manufacturer. The dashed line indicates the SE relation for T=21 °C, and the solid line is a fit to the SE relation of equation (1). Although the agreement with the data is satisfactory (note the logarithmic scales), the high precision of the measurements reveals small offset in nanoparticle diameter. Preferably, the calculated nanoparticle diameter can be corrected for those small deviations resulting e.g. from a hydration layer thickness ([20]) and/or surfactant molecules. Correction of the offset can be done based on experimental tests with nanoparticles having a nominal diameter or with comparative samples. Indeed, the solid curve in FIG. 3B reports an excellent agreement between theory and experiment if an increase of the radius by $I_H$=1.8+0.3 nm is considered for all particles.

To examine the SE relation (1) further, measurements at different temperatures using a micro heating stage (VAHEAT, Interherence) are performed. As exemplified for the case of 30 nm GNPs in the inset of FIG. 3B, a very good agreement between the experimental data (symbols) and the prediction of Eq. (1) is obtained when replacing $d_{nom}$ (dashed line) by a hydrodynamic diameter $d_H=d_{nom}+2I_H$ (solid line).

FIG. 3C shows histograms of nanoparticle diameters extracted from individual GNP trajectories according to the SE relation (1). Individual measurements were weighed by their trajectory lengths. Gaussian fits to the data establish normal distributions, allowing to determine a mean value $d_{mes}^{-}$ and/or a standard deviation σ(mes) ([21]). The data for 10, 15, 20 and 30 nm GNPs are recorded at 40 mW illumination power; the rest is recorded at 2 mW. The inset of FIG. 3C shows In and its error bar. Dashed line indicates the value of $I_H$ obtained from the global fit in FIG. 3B.

FIG. 3D illustrates a comparison of the inventive iNTA technique with various prior art techniques. To compare iNTA with the existing state-of-the-art methods, DLS (ZetaSizer ZS90), NTA (Nanosight NS500), Scanning electron microscopy (SEM, Hitachi S-4800) and transmission electron microscopy (TEM, Zeiss EM10) instruments were used to characterize GNPs with a nominal diameter of 30 nm, as an exemplary sample at the lower limit of the commercial NTA. The output of DLS measurements represents the intensity-weighted distribution. The results show evidently that the DLS and NTA size distributions have larger spreads than those of SEM and TEM measurements. The width of the iNTA distribution, however, equals that of TEM, thus, combining an excellent resolution with the advantages of optical measurements.

FIG. 4 illustrates further experimental results obtained with polydisperse nanoparticle samples using prior art techniques (FIG. 4A: DLS, FIG. 4B: NTA) or the inventive technique (FIGS. 4C-4G: iNTA). The polydisperse nanoparticle samples comprise a mixture of three nanoparticle populations with 15 nm, 20 nm and 30 nm GNPs. According to the inventive iNTA technique, a two-parametric nanoparticle scatter plot 200 is created, wherein each nanoparticle 2 has a plot position determined by the calculated nanoparticle size and the calculated nanoparticle scattering cross-section thereof and all nanoparticles 2 create a distribution of nanoparticle plot positions.

In FIGS. 4C to 4G, the horizontal and vertical axes of the nanoparticle scatter plot 200 denote the measured diameter and the third root of the iSCAT contrast, respectively. In each of the FIGS. 4C to 4G, a 2D Gaussian mixture model is used to identify different populations. The drawn lines establish the relationship between C and $d_{mes}$ according to the respective refractive indices while the shaded regions indicate the uncertainties in the refractive index data. Crosses in FIGS. 4C to 4G signify the medians of each distribution of nanoparticle plot positions.

FIG. 4A shows the intensity-weighted distribution of a DLS measurement (ZetaSizer ZS90), yielding a continuous featureless distribution representing the suspension containing 15 nm, 20 nm and 30 nm GNPs. As displayed in FIG. 4B, DFM-based NTA (Nanosight NS500) does not resolve the different populations either.

The two-parametric nanoparticle scatter plot 200 in FIG. 4C shows the iSCAT contrast C and the measured nanoparticle diameter $d_{mes}$ for individual trajectories extracted with iNTA. A visual inspection of the data clearly reveals three clusters 201, 202 and 203 corresponding to the three nanoparticle populations. In fact, the histogram of the iSCAT contrast C values plotted on the right-hand vertical axis also resolves the three populations on its own. Application of a two-dimensional (2D) Gaussian mixture model (GMM) with full covariance provides the three nanoparticle populations in a quantitative manner and identify the populations in the $d_{mes}$ histogram.

In FIGS. 4D and 4E, further examples are shown, where iNTA fully resolves mixtures of 10 nm and 15 nm GNP and of 40 nm and 60 nm PS spheres (PSS), respectively even though particles in this size range are usually not accessible in DFM-based methods [23].

The advantage of combining the knowledges of C and $d_{mes}$ in the nanoparticle scatter plot 200 becomes even more apparent when particles of similar size or $\sigma_{sca}$ are analysed, as shown in FIG. 4F for a mixture of 40 nm GNP, 100 nm PSS and 100 nm silica beads (SB). Neither C nor $d_{mes}$ alone provides reliable information about the composition of the sample, but their combination in the 2D nanoparticle scatter plot 200 provides robust evidence for the existence of three different populations (species). Again, application of a GMM analysis allows to decompose the C and $d_{mes}$ histograms. The horizontal stretch of the data clouds of the distributions in FIGS. 4C and 4D are due to the uncertainty resulting from short trajectories or localization errors, whereas the diagonal extension of the data in FIGS. 4E and 4F, represents the true size distribution in the sample.

As a further nanoparticle property, the refractive index (RI) of the nanoparticles can be obtained. In particular based on equation (2), measurements of the iSCAT contrast C and the measured nanoparticle diameter $d_{mes}$ provide direct access to the RI of the nanoparticles. As an example, RI for gold ($n_{AU}$=0.63+2.07i) is used for fitting the data in FIGS. 4C, 4D and 4F, resulting in the solid lines. The horizontal intercept yields another independent measure for the hydration shell 21H, which amounts to 1.6 nm, 1.8 nm, and 1.5 nm for the three cases respectively. This information can be used to relate the experimentally measured C and the expected value of $\sigma_{sca}$ with one single calibration parameter for the setup.

Furthermore, fitting the data for PSS and SB in FIGS. 4E and 4F provides $n_{PS}$=1.62 and $n_{Si}$=1.45, which is in good agreement with literature values. It is noted that for PSS and SB, the RI curves calculated from the full Mie theory [19] deviate from a straight line because $\sigma_{sca}$ for larger nanoparticles begins to contain contributions from higher order multipoles.

As further experimental test, a more complex mixture of 10 nm and 20 nm GNPs with and without polyethylene glycol coatings (Creative Diagnostics; MW of PEG 3,000) is investigated. FIG. 4G illustrates the high performance of iNTA by clearly distinguishing four populations 201, 202, 203 and 204. Moreover, the measurements provide the direct assessment of the thickness of the PEG layer, which in this case corresponds to about 12 nm. These results pave the way for further sensitive and quantitative investigations of composite nanoparticle samples and their interaction with the surrounding liquid phase.

The superior sensitivity and resolution of iNTA measurements allows not only the investigation of monodisperse and preknown polydisperse nanoparticles, but also investigations of realistic field problems. Indeed, there is a significant number of applications in which nanoparticles of various substances and sizes are be characterized in a fast, accurate, and non-invasive manner. The inventors have tested the invention with the analysis of synthetically produced lipid vesicles as well as extracellular vesicles (EV), which contain various proteins, nucleic acids, or other biochemical entities either in their interior and/or attached to them. EVs have been identified as conveyers for cell-cell communication and as disease markers but known studies are partly hampered by the throughput and resolution in their quantitative assessment [24]. EVs are often grouped as exosomes (diameter 30 to 150 nm, originating from inside a cell) and microvesicles (diameter 100 to 1000 nm, stemming from the cell membrane), while particles smaller than 150 nm might also be referred to as small extracellular vesicles (sEVs). The invention has been tested with investigating synthetically produced liposomes, parasite EVs and human urine EVs as described in the following.

Figure 5:
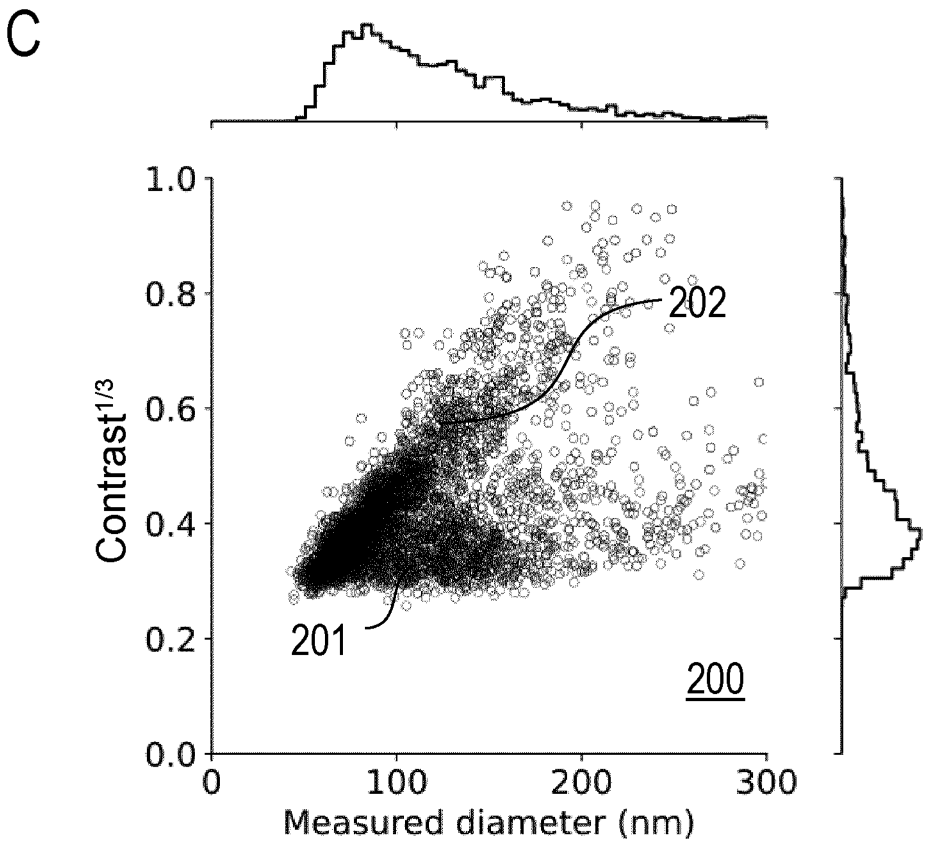
FIG. 5: further experimental results of investigating polydisperse and/or biological particle samples.

FIG. 5A shows the outcome of the inventive iNTA measurements on a sample of synthetically produced liposomes, which was filtered to exclude particles larger than about 200 nm. Liposomes consist of a lipid bilayer shell 2A surrounding an aqueous interior (see inset in FIG. 5A) and can, therefore, be modelled by a generalized Mie theory that takes into account the thickness ($t_{sh}$) and RI ($n_{sh}$) of the shell as well as the RI of the interior ($n_{in}$).

The drawn line in FIG. 5A confirms that the model based on these values fits the whole experimental data extremely well. To illustrate the sensitivity of the results to variations of the liposome inner part, the dashed curves are plotted in FIG. 5A for larger $n_{in}$ but the same shell parameters. It is noted that the high SNR of iNTA allows to clearly discriminate against a simple model for a uniform nanosphere.

As a further example, parasite EVs have been investigated which create Leishmaniasis, which is a potentially mortal tropical disease. *Leishmania* parasites secrete numerous virulence factors, most of which are carried together with small RNA inside EVs. Quantitative characterization of the vesicles emitted by *Leishmania* (LEVs) would be of great value for understanding their role in the infection process, but reliable data are missing. FIG. 5B present an iNTA nanoparticle scatter plot 200 of LEVs. The size histogram is consistent with published results using DLS and NTA [25]. The iNTA data, however, provide access to more quantitative insight. Based on a shell model and an examination of isosurfaces of constant C and $d_{mes}$ of three points marked in FIG. 5B, the inventors have found that $n_{in}$ remains well bounded to a tight interval of (1.334, 1.38) with $t_{sh} \in (3, 8)$ nm and $n_{sh} \in (1.44, 1.54)$ to account for various lipid shell thicknesses and up to 60% protein content in the shell. The deduced values of $n_{in}$ imply that particles of different sizes are sparsely loaded and are mostly made of water.

Extracellular vesicles are usually grouped in two classes of exosomes and microvesicles with different cellular origins. Nevertheless, the smooth and confined 2D nanoparticle distribution in FIG. 5B shows that all LEVs have a similar consistency. To elucidate this further, the drawn solid line is presented as an example obtained for $n_{sh}$=1.44, $n_{in}$=1.363 and $t_{sh}$=5 nm. The curve reproduces the data trend quite well, but the larger spread in C as compared to the data for pure liposomes (see FIG. 5A) reveals detectable variations of $t_{sh}$, $n_{sh}$ or $n_{in}$, which provide a gateway to quantitative studies of parasite secretion activity. For instance, if $n_{sh}$=1.44 and $t_{sh}$=5 nm, as well as an effective refractive index of 1.6 for protein matter are assumed, the protein content of the EV inner solution is estimated to be about 10%±3% as delineated by the dotted curves in FIG. 5B.

As a further example, human urine EVs have been investigated. Urine is known to contain EVs, and it is expected that these hold a great promise to serve as disease markers. Urine has been analysed by NTA ([26], [27]) yielding a unimodal vesicle size distribution in a range of 50 to 300 nm. FIG. 5C shows, however, that although the iNTA size histogram also presents a continuous broad distribution, its 2D nanoparticle scatter plot 200 clearly resolves various sub-populations. Indeed, the observed bifurcation of the current data distribution starting at about d=100 nm sheds a new light on EVs that have previously been simply grouped as microvesicles.

Based on the assumption that all detected nanoparticles are EVs, calculating isosurfaces of constant C and $d_{mes}$ for seven points marked in FIG. 5C shows that the lower cloud 201 represents EVs that mostly contain water. The small and large particles on the diagonal cloud 202, however, have larger values of $n_{in}$. All together, the data allow us define about three classes of particles: sEVs or exosomes with size distribution 50 to 150 nm, constituting over 50% of all EVs, microvesicles with size distribution 100 to 250 nm but a high protein content (large scattering cross section), as well as microvesicles with size distribution 80 to 300 nm and very little biological content. The characteristic iNTA plot 200 of urine provides a basis for quantifying the constituents of EVs and shows the advantageous potential capability of the invention to explore deviations caused by illnesses.

Advantageously, by combining interferometric scattering microscopy and nanoparticle tracking analysis, iNTA pushes the limits of sensitivity, precision and resolution in determining the size and/or refractive index of nanoparticle mixtures. The inventors have demonstrated the power of iNTA by not only detecting nanoparticles that are more weakly scattering than previously reported, but also by deciphering complex nanoparticle species in various polydispersions and determining a hydration layer of nanoparticles, like e.g. colloidal gold nanoparticles. Moreover, the inventors have shown that the current performance of iNTA is able to shed new light on medical diagnostics.

The features of the invention disclosed in the above description, the drawings and the claims can be of significance individually, in combination or sub-combination for the implementation of the invention in its different embodiments.

The invention claimed is:

1. A method of determining nanoparticle properties of nanoparticles included in a sample, comprising the steps of collecting sequential frames of images by employing an interferometric microscope device, wherein the sample is illuminated with illumination light from a coherent light source device and the images are created by scattering light from the nanoparticles superimposed with non-scattered reference light, said scattering light and reference light having a wavelength larger than a cross-sectional dimension of the nanoparticles, tracking the nanoparticles in the sequential frames of images, wherein at least one interferometric point spread function (iPSF) feature of each of the nanoparticles is established and nanoparticle trajectory motion data are determined for each nanoparticle, comprising the nanoparticle positions in each frame, for each nanoparticle, calculating a nanoparticle size from the nanoparticle trajectory motion data of the nanoparticle, for each nanoparticle, calculating an interferometric nanoparticle contrast from the at least one iPSF feature of the nanoparticle, creating a two-parametric nanoparticle scatter plot, wherein each nanoparticle has a plot position based on the calculated nanoparticle size obtained from the nanoparticle trajectory motion data of the nanoparticle and the calculated interferometric nanoparticle contrast obtained from the at least one iPSF feature of the nanoparticle and all the nanoparticles create a distribution of nanoparticle plot positions, and analysing the distribution of nanoparticle plot positions for providing the nanoparticle properties, wherein the sample is a liquid comprising the nanoparticles to be investigated in a dispersed manner.

2. The method according to claim 1, wherein the plot positions are determined by the nanoparticle sizes and values of a function of the maximum interferometric nanoparticle contrast of the nanoparticles.

3. The method according to claim 1, wherein the analysing step comprises at least one of calculating at least one mean nanoparticle size of the nanoparticles, calculating at least one standard deviation of nanoparticle sizes of the nanoparticles, and calculating dimensions of a multi-layer structure of the nanoparticles by employing a generalized Mie theory and predetermined nanoparticles' parameters included in the generalized Mie theory.

4. The method according to claim 1, further comprising a step of for each nanoparticle, calculating a scattering cross section from the interferometric nanoparticle contrast thereof.

5. The method according to claim 4, wherein the plot positions are determined by the nanoparticle sizes and values of a function of scattering cross sections of the nanoparticles.

6. The method according to claim 4, further comprising a step of for each nanoparticle, determining an effective refractive index from its size and scattering cross section using a generalized Mie theory.

7. The method according to claim 6, wherein the plot positions are determined by the nanoparticle sizes and values of the effective refractive index of the nanoparticles.

8. The method according to claim 6, wherein the analysing step comprises at least one of calculating at least one mean refractive index of the nanoparticles, calculating at least one standard deviation of refractive indices of the nanoparticles, and calculating refractive indices of a multi-layer structure of the nanoparticles by employing the generalized Mie theory and predetermined nanoparticles' parameters included in the generalized Mie theory.

9. The method according to claim 1, wherein the analysing step comprises calculating a surface layer, that is accumulated on the nanoparticle surfaces.

10. The method according to claim 1, wherein the nanoparticles comprise at least two nanoparticle groups, a mean nanoparticle size, a standard deviation of nanoparticle sizes, a mean refractive index, a standard deviation of refractive indices, a mean nanoparticle shape and/or a nanoparticle material of the nanoparticles of one of the nanoparticle groups differ from the mean nanoparticle size, the standard deviation of nanoparticle sizes, the mean refractive index, the standard deviation of refractive indices, the mean nanoparticle shape and/or the nanoparticle material of the nanoparticles of another one of the nanoparticle groups, and the analysing step comprises identifying the nanoparticle groups.

11. The method according to claim 10, wherein the analysing step comprises calculating the mean nanoparticle sizes, the standard deviations of nanoparticle sizes, the mean refractive indices, the standard deviations of refractive indices, the mean nanoparticle shapes and/or the nanoparticle materials of the nanoparticle groups.

12. The method according to claim 1, wherein the analysing step comprises creating a nanoparticle size histogram and an interferometric nanoparticle contrast histogram and decomposing at least one of the nanoparticle size histogram and the interferometric nanoparticle contrast histogram.

13. The method according to claim 12, wherein the interferometric nanoparticle contrast histogram is created based on cubic root values of the interferometric nanoparticle contrast of the nanoparticles.

14. The method according to claim 4, wherein the analysing step comprises creating a nanoparticle size histogram and a nanoparticle scattering cross section histogram and decomposing at least one of the nanoparticle size histogram and the nanoparticle scattering cross section histogram.

15. The method according to claim 14, wherein the nanoparticle scattering cross section histogram is created based on sixth root values of scattering cross sections of the nanoparticles.

16. The method according to claim 6, wherein the analysing step comprises creating a nanoparticle size histogram and an effective refractive index histogram and decomposing at least one of the nanoparticle size histogram and the effective refractive index histogram.

17. The method according to claim 1, wherein the analysing step comprises at least one of applying a pattern recognition on the distribution of nanoparticle plot positions, and applying a machine-learning-based data analysis on the distribution of nanoparticle plot positions.

18. The method according to claim 1, wherein the nanoparticles comprise at least one of nanoparticles with a characteristic dimension in a range from 5 nm to 500 nm, spherical nanoparticles, non-spherical nanoparticles, inorganic nanoparticles, organic nanoparticles, nanoparticles with surface layers, and nanoparticles with a multi-layer structure.

19. The method according to claim 1, further comprising a step of flowing the sample through a field of view of the interferometric microscope device.

20. The method according to claim 1, wherein a multi-wavelength measurement is executed, wherein the step of collecting sequential frames of the interference patterns is conducted with the illumination light having at least two different wavelengths, and the step of analysing the distribution of nanoparticle plot positions is executed at the different wavelengths.

21. The method according to claim 1, wherein the nanoparticle properties include spectroscopic information of the nanoparticles.

22. The method according to claim 1, further comprising a step of detecting sample fluorescence with the interferometric microscope device being provided with at least one spectral filter.

23. The method according to claim 1, wherein the illumination light is linearly polarized.

24. The method according to claim 23, wherein the step of collecting sequential frames of the images is conducted at two orthogonal polarizations.

25. The method according to claim 1, further comprising a step of estimating a nanoparticle concentration in the sample.

26. The method according to claim 1, wherein the coherent light source device is a pulsed light source device creating illumination light pulses.

27. The method according to claim 26, wherein the frames of the image are collected synchronized with the illumination light pulses.

28. The method according to claim 1, further comprising at least one of analysing the trajectory motion data to determine viscoelastic properties of the sample, and analysing the trajectory motion data to determine a geometry of the nanoparticles.

29. The method according to claim 1, wherein the step of collecting sequential frames of the images is conducted with at least two different temperatures of the sample.

30. The method according to claim 1, further comprising a step of controlling a balance between portions of the scattering light from the nanoparticles and the reference light.

31. The method according to claim 1, wherein the at least one iPSF feature comprises at least one of an iPSF contrast, a height of a central lobe of the iPSF, an integrated iPSF, an overall brightness of the iPSF, an iPSF shape, and shape features in a central lobe and side lobes of the iPSF.

32. The method according to claim 1, wherein the interferometric nanoparticle contrast is an interferometric scattering (iSCAT) contrast.

33. A test apparatus configured for executing the method according to claim 1, said apparatus comprising:

an interferometric microscope device comprising a coherent light source device, imaging optics, a sample receptacle and a detector camera device, wherein the coherent light source device is arranged for illuminating the sample in the sample receptacle with illumination light, and the detector camera device is arranged for collecting sequential frames of images created by superimposing scattering light from the nanoparticles and non-scattered reference light, said scattering light and reference light having a wavelength larger than a cross-sectional dimension of the nanoparticles, and an analysing device being arranged for establishing at least one interferometric point spread function (iPSF) features of the nanoparticles, tracking the nanoparticles in the sequential frames of the images and determining nanoparticle trajectory motion data for each nanoparticle, comprising the nanoparticle positions in each frame, wherein the analysing device further is arranged for calculating a nanoparticle size from the trajectory motion data for each nanoparticle, calculating an interferometric nanoparticle contrast from the at least one iPSF feature of each nanoparticle, creating a two-parametric nanoparticle scatter plot, wherein each nanoparticle has a plot position determined by the calculated nanoparticle size and the calculated interferometric nanoparticle contrast thereof and all nanoparticles create a distribution of nanoparticle plot positions, and analysing the distribution of nanoparticle plot positions for providing the nanoparticle properties.

34. A test apparatus being configured for determining nanoparticle properties of nanoparticles included in a sample, comprising an interferometric microscope device comprising a coherent light source device, imaging optics, a sample receptacle and a detector camera device, wherein the coherent light source device is arranged for illuminating the sample in the sample receptacle with illumination light, and the detector camera device is arranged for collecting sequential frames of images created by superimposing scattering light from the nanoparticles and non-scattered reference light, said scattering light and reference light having a wavelength larger than a cross-sectional dimension of the nanoparticles, and an analysing device being arranged for establishing at least one interferometric point spread function (iPSF) features of the nanoparticles, tracking the nanoparticles in the sequential frames of the images and determining nanoparticle trajectory motion data for each nanoparticle, comprising nanoparticle positions in each frame, wherein the analysing device further is arranged for calculating a nanoparticle size from the trajectory motion data for each nanoparticle, calculating an interferometric nanoparticle contrast from the at least one iPSF feature of each nanoparticle, creating a two-parametric nanoparticle scatter plot, wherein each nanoparticle has a plot position determined by the calculated nanoparticle size obtained from the nanoparticle trajectory motion data of the nanoparticle and the calculated interferometric nanoparticle contrast obtained from the at least one iPSF feature of the nanoparticle and all nanoparticles create a distribution of nanoparticle plot positions, and analysing the distribution of nanoparticle plot positions for providing the nanoparticle properties, wherein the sample is a liquid comprising the nanoparticles to be investigated in a dispersed manner.

* * * * *